(12) United States Patent
Miyanishi et al.

(10) Patent No.: US 12,006,557 B2
(45) Date of Patent: Jun. 11, 2024

(54) STEEL MATERIAL AND COMPONENT

(71) Applicant: NIPPON STEEL CORPORATION, Tokyo (JP)

(72) Inventors: Kei Miyanishi, Tokyo (JP); Makoto Egashira, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 521 days.

(21) Appl. No.: 17/423,964

(22) PCT Filed: Jan. 21, 2020

(86) PCT No.: PCT/JP2020/001966
§ 371 (c)(1),
(2) Date: Jul. 19, 2021

(87) PCT Pub. No.: WO2020/153361
PCT Pub. Date: Jul. 30, 2020

(65) Prior Publication Data
US 2022/0145416 A1 May 12, 2022

(30) Foreign Application Priority Data
Jan. 21, 2019 (JP) ................................. 2019-007949

(51) Int. Cl.
*C21D 9/32* (2006.01)
*C21D 6/00* (2006.01)
(Continued)

(52) U.S. Cl.
CPC .............. *C21D 9/32* (2013.01); *C21D 6/004* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS

2017/0067140 A1  3/2017  Aiso et al.
2019/0300994 A1  10/2019  Miyanishi et al.

FOREIGN PATENT DOCUMENTS

CN         106029925 A      10/2016
JP         2001181791 A  *   7/2001
(Continued)

*Primary Examiner* — Anthony M Liang
(74) *Attorney, Agent, or Firm* — Greer Burns & Crain Ltd.

(57) ABSTRACT

There is provided a steel material that is excellent in machinability, and that provides a high roller-pitting fatigue strength, a high high-cycle bending fatigue strength, and a high low-cycle bending fatigue strength when being subjected to induction hardening to be produced into an induction-hardened component. The steel material according to the present disclosure includes a chemical composition consisting of, in mass %, C: 0.40 to 0.70%, Si: 0.15 to 2.10%, Mn: 0.30 to 1.15%, Cr: 0.01 to less than 0.50%, S: 0.005 to 0.070%, N: 0.0020 to 0.0200%, Ti: 0.0080 to 0.2000%, B: 0.0005 to 0.0050%, Al: 0.005 to 0.100%, and P: less than 0.050%, with the balance being Fe and impurities, and satisfying Formula (1) to Formula (5) described herein, and has a ferrite area fraction of 40% or less and a martensite area fraction of 10% or less.

4 Claims, 2 Drawing Sheets

(51) Int. Cl.
*C21D 8/00* (2006.01)
*C22C 38/00* (2006.01)
*C22C 38/02* (2006.01)
*C22C 38/04* (2006.01)
*C22C 38/06* (2006.01)
*C22C 38/12* (2006.01)
*C22C 38/16* (2006.01)
*C22C 38/28* (2006.01)
*C22C 38/32* (2006.01)
*C22C 38/40* (2006.01)

(52) U.S. Cl.
CPC ............ *C21D 8/005* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/16* (2013.01); *C22C 38/28* (2013.01); *C22C 38/32* (2013.01); *C22C 38/40* (2013.01); *C21D 2211/008* (2013.01)

(56) References Cited

FOREIGN PATENT DOCUMENTS

| | | |
|---|---|---|
| JP | 2004156071 A | 6/2004 |
| JP | 2007131871 A | 5/2007 |
| JP | 2007332440 A | 12/2007 |
| WO | 2018016506 A1 | 1/2018 |

* cited by examiner

STEEL MATERIAL AND COMPONENT

This is a National Phase Application filed under 35 U.S.C. § 371, of International Application No. PCT/JP2020/001966, filed Jan. 21, 2020, the contents of which are incorporated by reference.

TECHNICAL FIELD

The present invention relates to a steel material and a component, and more particularly to a steel material to be a starting material of an induction-hardened component and a component made by subjecting the steel material to induction hardening. A component subjected to induction hardening will be herein referred to as an "induction-hardened component". Note that an induction-hardened component is not necessarily subjected entirely to induction hardening treatment, and a component subjected partly to induction hardening treatment is also included in an induction-hardened component. In other words, a component including a portion subjected to induction hardening (hereinafter, referred to as a "hardened portion") and a portion not subjected to the induction hardening (hereinafter, referred to as a non-hardened portion) is herein defined as an "induction-hardened component". Note that a component entirely subjected to induction hardening naturally qualifies as an induction-hardened component.

BACKGROUND ART

A component used in a power transmitting part, typically a differential gear, is required to be improved in roller-pitting fatigue strength and bending fatigue strength. For the purpose of improving roller-pitting fatigue strength and bending fatigue strength, a component subjected to casehardening treatment may be used.

Typical casehardening treatments include carburizing treatment and induction hardening treatment. Carburizing treatment increases carbon in an outer layer of a steel material to harden a surface of the steel material. Carburizing treatment is applied mainly to gears, continuously variable transmission (CVT) components, and constant velocity joint (CVJ) components. The mainstream of carburizing treatment is performing batch processing in a gas atmosphere, where heating and holding are performed in the neighborhood of 930° C. for several hours or longer. Therefore, carburizing treatment consumes a great deal of energy and is cost consuming. Moreover, it is difficult to make carburizing treatment in-line. Furthermore, a carburizing efficiency of carburizing treatment is decreased for large components.

In contrast, induction hardening treatment can harden only a required region of a steel material. Therefore, induction hardening treatment enables reduction of a casehardening treatment time and reduction of energy and is thus very advantageous to make the environment clean. For that reason, components to be used as power transmitting parts are often subjected to induction hardening. Hereinafter, a component subjected to induction hardening will be referred to as an induction-hardened component.

Before being subjected to induction hardening, an induction-hardened component is often subjected to machining such as cutting. Therefore, a steel material to be a starting material of an induction-hardened component is required to have a high machinability.

Patent Literature 1 (Japanese Patent Application Publication No. 2007-131871), Patent Literature 2 (Japanese Patent Application Publication No. 2007-332440), and Patent Literature 3 (Japanese Patent Application Publication No. 2004-156071) disclose a steel material to be a starting material for an induction-hardened component and an induction-hardened component.

A steel material disclosed in Patent Literature 1 consists of, in mass %, C: 0.35 to 0.65%, Si: 0.50% or less, Mn: 0.65 to 2.00%, P: 0.015% or less, S: 0.003 to 0.080%, Mo: 0.05 to 0.50%, Al: 0.10% or less, N: 0.0070% or less, and O (oxygen): 0.0020% or less, with the balance being Fe and impurities and has a martensite area fraction of 70% or more. Patent Literature 1 discloses that the steel material having the above configuration has an increased induction hardenability, increasing a static strength and a fatigue strength of an induction-hardened component.

A steel material disclosed in Patent Literature 2 consists of, in mass %, C: 0.35 to 0.6%, Si: 0.01 to 1.0%, Mn: 0.2 to 1.8%, S: 0.001 to 0.15%, Al: 0.001 to 0.05%, N: 0.002 to 0.020%, P: 0.025% or less, and O: 0.0025% or less and further contains one or more types of Cr: 1.8% or less, Mo: 1.5% or less, Ni: 3.5% or less, B: 0.006% or less, V: 0.5% or less, Nb: 0.04% or less, and Ti: 0.2% or less, with the balance being Fe and unavoidable impurities, wherein a hardened layer has a hardness of HV550 or more after induction hardening treatment, and a core portion has a ferrite area fraction of 50% or less, and an index A is −11 or more. Here, the index A is $A=Mo+0.227Ni+190B-7.18C-0.087Si-17.2P-2.74V-0.00955Hs+0.0344N\gamma$, where Hs is a surface hardness, and $N\gamma$ is a prior-austenite grain size of an induction-hardened layer. Patent Literature 2 discloses that, by bringing the index A to −11 or more, the steel material having the above configuration is prevented from suffering from brittle fracture in its induction-hardened layer, which increases a low-cycle fatigue properties of an induction-hardened component.

A formed component to be subjected to induction hardening disclosed in Patent Literature 3 contains, in mass %, C: 0.5 to 0.7%, Si: 0.1 to 1.5%, Mn: 0.2 to 1.5%, Cr: 0 to 1.5%, V: 0 to 0.10%, S: 0.002 to 0.05%, Al: 0.01 to 0.04%, and N: 0.005 to 0.012%, with the balance being Fe and impurities, in the impurities, Ti being 0.003% or less, O being 0.0015% or less, P being 0.020% or less, wherein in its outer-layer region, an average minor axis of pro-eutectoid ferrite is 8 μm or less. In addition, a value A expressed as $A=(Mn_{MIN}/Mn_{AVE})$ ($Mn_{MIN}$: lower-limit value of Mn concentration in outer-layer region (mass %), $Mn_{AVE}$: average value of Mn concentration (mass %)) is 0.80 or more. Furthermore, the number of inclusions other than MnS each having an aspect ratio of 3 or less and a minor axis of 10 μm or more is 2/mm² or less. Patent Literature 3 discloses that a bearing component obtained by subjecting the formed component having the above configuration to induction tempering is excellent in rolling contact fatigue life.

CITATION LIST

Patent Literature

Patent Literature 1: Japanese Patent Application Publication No. 2007-131871
Patent Literature 2: Japanese Patent Application Publication No. 2007-332440
Patent Literature 3: Japanese Patent Application Publication No. 2004-156071

SUMMARY OF INVENTION

Technical Problem

However, even the induction-hardened components disclosed in Patent Literatures 1 to 3 may be difficult to establish compatibility between a sufficiently high roller-pitting fatigue strength and a sufficiently high rotating bending fatigue strength.

In addition, bending fatigue strength includes high-cycle bending fatigue strength and low-cycle bending fatigue strength. High-cycle bending fatigue strength herein means a rupture strength at cycles of stress loading of $1\times10^7$. Low-cycle bending fatigue strength herein means a rupture strength at cycles of stress loading of $1\times10^4$. A power transmitting part can be applied to a component, typically a pinion gear in a differential gear, on which an impact load is to be imposed. A power transmitting part such as a pinion gear is required to be excellent in, of bending fatigue strength, both high-cycle bending fatigue strength and low-cycle bending fatigue strength. Although taking high-cycle bending fatigue strength into consideration, Patent Literature 1 to Patent Literature 3 have no discussion about low-cycle bending fatigue strength.

An objective of the present invention is to provide a steel material that is excellent in machinability and provides a high roller-pitting fatigue strength, a high high-cycle bending fatigue strength, and a high low-cycle bending fatigue strength when being subjected to induction hardening to be produced into an induction-hardened component, and to provide an induction-hardened component.

Solution to Problem

A steel material according to the present disclosure includes
a chemical composition containing, in mass %:
C: 0.40 to 0.70%,
Si: 0.15 to 2.10%,
Mn: 0.30 to 1.15%,
Cr: 0.01 to less than 0.50%,
S: 0.005 to 0.070%,
N: 0.0020 to 0.0200%,
Ti: 0.0080 to 0.2000%,
B: 0.0005 to 0.0050%,
Al: 0.005 to 0.100%, and
P: less than 0.050%,
with the balance being Fe and impurities, and
satisfying Formula (1) to Formula (5), wherein
a ferrite area fraction is 40% or less, and a martensite area fraction is 10% or less.

$$290C+50Si+430 \geq 631.0 \quad (1)$$

$$C+(1/7)Si+(1/5)Mn+(1/9)Cr+V+(1/25)Mo \leq 0.900 \quad (2)$$

$$(1+0.7Si)\times(1+3.3333Mn)\times(1+2.16Cr)\times(1+3.00Mo)\times$$
$$(1+1.73V)\times(1+0.365Cu)\times(1+0.363Ni)\times(2.616-$$
$$1.6C) \geq 5.80 \quad (3)$$

$$Ti-4\times N \geq 0 \quad (4)$$

$$9.7Mn_\theta+32.4Cr_\theta \leq 25.9 \quad (5)$$

where each symbol of an element in Formula (1) to Formula (4) is to be substituted by a content of a corresponding element (mass %), and if the corresponding element is not contained, the symbol of an element is to be substituted by "0"; $Mn_\theta$ in Formula (5) is to be substituted by a concentration of Mn (mass %) in cementite, and $Cr_\theta$ in Formula (5) is to be substituted by a concentration of Cr (mass %) in cementite.

A component according to the present disclosure includes
a hardened layer, and
a core portion inner than the hardened layer, wherein
the hardened layer has a martensite area fraction of 90% or more, and
the core portion has a chemical composition containing, in mass %:
C: 0.40 to 0.70%,
Si: 0.15 to 2.10%,
Mn: 0.30 to 1.15%,
Cr: 0.01 to less than 0.50%,
S: 0.005 to 0.070%,
N: 0.0020 to 0.0200%,
Ti: 0.0080 to 0.2000%,
B: 0.0005 to 0.0050%,
Al: 0.005 to 0.100%, and
P: less than 0.050%,
with the balance being Fe and impurities, and
satisfying Formula (1) to Formula (5), wherein
a ferrite area fraction is 40% or less, and a martensite area fraction is 10% or less:

$$290C+50Si+430 \geq 631.0 \quad (1)$$

$$C+(1/7)Si+(1/5)Mn+(1/9)Cr+V+(1/25)Mo \leq 0.900 \quad (2)$$

$$(1+0.7Si)\times(1+3.3333Mn)\times(1+2.16Cr)\times(1+3.00Mo)\times$$
$$(1+1.73V)\times(1+0.365Cu)\times(1+0.363Ni)\times(2.616-$$
$$1.6C) \geq 5.80 \quad (3)$$

$$Ti-4\times N \geq 0 \quad (4)$$

$$9.7Mn_\theta+32.4Cr_\theta \leq 25.9 \quad (5)$$

where each symbol of an element in Formula (1) to Formula (4) is to be substituted by a content of a corresponding element (mass %), $Mn_\theta$ in Formula (5) is to be substituted by a concentration of Mn (mass %) in cementite, and $Cr_\theta$ in Formula (5) is to be substituted by a concentration of Cr (mass %) in cementite.

Advantageous Effect of Invention

The steel material according to the present invention is excellent in machinability and provides a high roller-pitting fatigue strength, a high high-cycle bending fatigue strength, and a high low-cycle bending fatigue strength when being subjected to induction hardening to be produced into an induction-hardened component. The induction-hardened component according to the present disclosure has a high roller-pitting fatigue strength, a high high-cycle bending fatigue strength, and a high low-cycle bending fatigue strength.

DESCRIPTION OF EMBODIMENT

Figure 1:
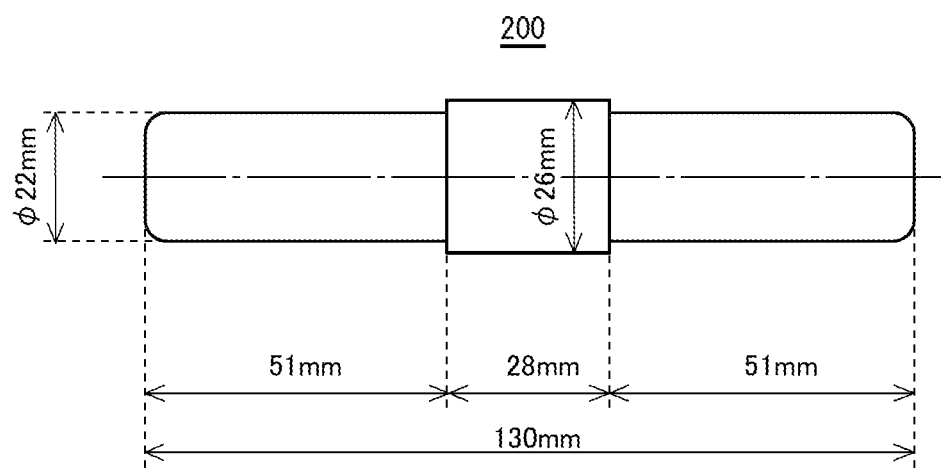
FIG. 1 is a plan view of a test specimen for a roller-pitting fatigue test fabricated in Example.

To increase a roller-pitting fatigue strength and a bending fatigue strength of an induction-hardened component, increasing a content of C in a steel material to be a starting material of the induction-hardened component is effective. For example, when the content of C is 0.40 mass % or more, a high roller-pitting fatigue strength and a high bending fatigue strength are obtained. However, as the content of C in the steel material is increased, a hardness of the steel material before cutting is increased, and a machinability of the steel material is decreased.

Hence, the present inventors conducted studies about a steel material, on the precondition that a content of C in the steel material is 0.40% or more, of which a roller-pitting fatigue strength and a bending fatigue strength are increased when the steel material is subjected to induction hardening to be produced to be an induction-hardened component and of which a machinability can be maintained to be high in spite of the content of C being 0.40% or more. As a result, the present inventors considered that a steel material including a chemical composition consisting of, in mass %, C: 0.40 to 0.70%, Si: 0.15 to 2.10%, Mn: 0.30 to 1.15%, Cr: 0.01 to less than 0.50%, S: 0.005 to 0.070%, N: 0.0020 to 0.0200%, Ti: 0.0080 to 0.2000%, B: 0.0005 to 0.0050%, Al: 0.005 to 0.100%, and P: less than 0.050%, Mo: 0 to 1.00%, Ni: 0 to 1.00%, Cu: 0 to 1.00%, Ca: 0 to 0.0050%, Mg: 0 to 0.0050%, Te: 0 to 0.20%, Zr: 0 to 0.0050%, rare earth metal (REM): 0 to 0.0050%, Nb: 0 to 0.20%, V: 0 to 0.35%, Sb: 0 to 0.015%, and Pb: 0 to 0.09%, with the balance being Fe and impurities, can provide a sufficient machinability, and an induction-hardened component produced from the steel material as a starting material can provide an excellent roller-pitting fatigue strength and an excellent bending fatigue strength.

However, only making the steel material have the above-described chemical composition in some cases failed to provide a sufficient machinability and to provide a sufficient roller-pitting fatigue strength and a sufficient bending fatigue strength when the steel material is produced into the induction-hardened component. Hence, the present inventors further conducted investigations and studies about a steel material that provides a sufficient machinability and provides a sufficient roller-pitting fatigue strength and a sufficient bending fatigue strength when being produced into an induction-hardened component. Consequently, the present inventors obtained the following findings.

(A) A surface hardness of an induction-hardened component has a correlation with a content of C and a content of Si in steel. In addition, as a surface hardness of an induction-hardened component is increased, a roller-pitting fatigue strength of the induction-hardened component is increased. Hence, the present inventors conducted investigations and studies about a relation between a content of C and a content of Si in a steel material and a roller-pitting fatigue strength of an induction-hardened component for which the steel material is used as a starting material. As a result, the present inventors found that when a content of C and a content of Si in a steel material satisfy Formula (1), a roller-pitting fatigue strength of an induction-hardened component for which the steel material is used as a starting material can be increased.

$$290C+50Si+430 \geq 631.0 \qquad (1)$$

Here, each symbol of an element in Formula (1) is to be substituted by a content of a corresponding element (in mass %).

Let FN1 be defined as FN1=290C+50Si+430. FN1 is equivalent to a \Tickers hardness of a hardened layer that is formed in an outer layer of an induction-hardened component produced by subjecting a steel material to induction hardening and then to tempering at 300° C. In the following description, the Vickers hardness of the hardened layer that is formed in the outer layer of the induction-hardened component produced by subjecting a steel material to induction hardening and then to tempering at 300° C. will be referred to as a "300° C.-tempered hardness".

It is generally known that a roller-pitting fatigue strength of an induction-hardened component obtained by a roller-pitting fatigue test has a positive correlation with a 300° C.-tempered hardness of the induction-hardened component. The present inventors investigated a relation between a roller-pitting fatigue strength obtained by a roller-pitting fatigue test and a 300° C.-tempered hardness. As a result, it was revealed that a sufficiently high roller-pitting fatigue strength is obtained for an induction-hardened component when a 300° C.-tempered hardness of the induction-hardened component is 631.0 Hv or more. Therefore, FN1 is to be 631.0 or more. In this case, a sufficiently high roller-pitting fatigue strength is obtained for an induction-hardened component for which the steel material is used as a starting material. If FN1 is less than 631.0, the induction-hardened component has a low roller-pitting fatigue strength and may suffer occurrence of pitting.

(B) If an excess of non-martensitic structures is present in a hardened layer of an induction-hardened component, the hardened layer includes a portion in which its hardness is locally low. In this case, a roller-pitting fatigue strength and a bending fatigue strength of the induction-hardened component are decreased when compared with a state where the hardened layer consists of martensitic structures (i.e., a state where no non-martensitic structures are present). Therefore, it is desired to reduce non-martensitic structures as many as possible in a hardened layer of an induction-hardened component.

To reduce non-martensitic structures, in a chemical composition of a steel material to be a starting material of an induction-hardened component, adjusting contents of Si, Mn, Cr, Mo, V, Cu, Ni, and C, which contribute to enhancement of hardenability, within their proper ranges is effective. Specifically, when the contents of the elements in the chemical composition fall within the above-described ranges, satisfy Formula (1), and further satisfy the following Formula (3), non-martensitic structures in a hardened layer of an induction-hardened component can be reduced, so as to increase a roller-pitting fatigue strength and a bending fatigue strength of the induction-hardened component.

$$(1+0.7Si)\times(1+3.3333Mn)\times(1\pm2.16Cr)\times(1+3.00Mo)\times \\ (1\pm1.73V)\times(1+0.365Cu)\times(1+0.363Ni)\times(2.616- \\ 1.6C)\geq 5.80 \qquad (3)$$

Here, each symbol of an element in Formula (3) is to be substituted by a content of a corresponding element (in mass %). When the corresponding element is not contained, the symbol of the element in the formula is to be substituted by "0".

Let FN3 be defined as FN3=(1+0.7Si)×(1+3.3333Mn)×(1+2.16Cr)×(1+3.001Mo)×(1+1.73V)×(1+0.365Cu)×(1+0.363Ni)×(2.616−1.6C). FN3 is an index of a hardenability of a steel material. As FN3 increases, the hardenability of the steel material is increased.

The present inventors investigated a relation between FN3 and non-martensitic structures in a hardened layer of an induction-hardened component, for steel materials of which contents of elements in a chemical composition fall within the above-described ranges and satisfy Formula (1), Formula (2), Formula (4), and Formula (5). As a result, it was revealed that FN3 being 5.80 or more enables formation of non-martensitic structures to be reduced sufficiently. Therefore, FN3 is to be 5.80 or more. On the precondition that contents of elements in a chemical composition fall within the above-described ranges and satisfy Formula (1), Formula (2), Formula (4), and Formula (5), when FN3 is 5.80 or more, the formation of non-martensitic structures in a hardened layer in an induction-hardened component can be reduced sufficiently. As a result, when the steel material is subjected to induction hardening to be produced into an induction-hardened component, a roller-pitting fatigue strength and a bending fatigue strength of the induction-hardened component can be increased sufficiently.

(C) Even when contents of elements in a chemical composition of a steel material are made to fall within the above-described ranges and to satisfy Formula (1) and Formula (3), a decrease in roller-pitting fatigue strength and bending fatigue strength of an induction-hardened component still occurs in some cases. Hence, the present inventors conducted further studies. Specifically, the present inventors investigated induction-hardened components for which obtaining a sufficient roller-pitting fatigue strength and a sufficient bending fatigue strength failed. As a result, it was revealed that, in the induction-hardened components for which obtaining a sufficient roller-pitting fatigue strength and a sufficient bending fatigue strength failed, variations in hardness occur in a hardened layer formed in an outer layer of each induction-hardened component. In other words, a hardness of the hardened layer varies. When there are variations in hardness in a hardened layer, a region having a low hardness is liable to serve as a start point of cracking. In this case, a roller-pitting fatigue strength and a bending fatigue strength of the induction-hardened component are decreased.

Based on the above findings, the present inventors conducted microstructure observation on a portion of a hardened layer of an induction-hardened component where the variations in hardness occur. As a result, it was revealed that in a portion of the hardened layer having a high hardness, cementite is not melted sufficiently during induction hardening and is left unmelted. Hence, the present inventors additionally investigated a chemical composition of the unmelted cementite. As a result, it was revealed that cementite left unmelted in a hardened layer has a high concentration of Mn and a high concentration of Cr.

The present inventors conducted further investigations, and as a result, it was revealed that, in a steel material of which contents of elements in its chemical composition fall within the above-described ranges, a high concentration of Mn and a high concentration of Cr in cementite increase a temperature necessary to dissolve cementite completely.

Based on the above results of the studies, the present inventors considered that the variations in hardness of a hardened layer of an induction-hardened component are caused by the following factors. When carburizing treatment is adopted in place of induction hardening, a heat treatment furnace is used. In a case where a steel material is heated in a heat treatment furnace, the steel material is heated at a high temperature for a long time. Therefore, a chemical composition of the steel material reaches an equilibrium state, which enables cementite to be dissolved sufficiently. In contrast, in induction hardening, a steel material is heated in a high-frequency heating apparatus for a short time. Therefore, as compared with a heat treatment furnace, a high-frequency heating apparatus finishes heating before a chemical composition of the steel material reaches an equilibrium condition. In other words, the chemical composition of the steel material during the high-frequency heating is in a non-equilibrium state. Therefore, cementite is partly left unmelted in the steel material after the high-frequency heating, and as a result, an amount of dissolved C varies, which results in occurrence of variations in hardness in a hardened layer of an induction-hardened component.

During high-frequency heating, an amount of dissolved C is affected by a solution temperature of cementite in a steel material. Mn and Cr in cementite increase a solution temperature of the cementite. When cementite contains Mn and Cr, cementite is liable to be left unmelted after high-frequency heating. A hardness of a hardened layer of the induction-hardened component is liable to vary, and a roller-pitting fatigue strength and a bending fatigue strength of the induction-hardened component are decreased.

Based on the above results of the studies, the present inventors considered that the variations in hardness of a hardened layer of an induction-hardened component can be suppressed by controlling a concentration of Mn and a concentration of Cr in cementite within their appropriate ranges in a steel material of which contents of elements in a chemical composition fall within the above-described ranges. Hence, the present inventors conducted investigations and studies about a relation between a concentration of Mn and a concentration of Cr in cementite in a steel material and a roller-pitting fatigue strength and a bending fatigue strength of an induction-hardened component. As a result, the present inventors found that when a concentration of Mn and a concentration of Cr in cementite in a steel material satisfy Formula (5), on the precondition that contents of elements in a chemical composition of the steel material fall within the above-described ranges and satisfy Formula (1) to Formula (4), variations in surface hardness can be suppressed in a hardened layer of an induction-hardened component produced by subjecting the steel material to induction hardening, and as a result, a roller-pitting fatigue strength and a bending fatigue strength of the induction-hardened component can be increased.

$$9.7Mn_\theta + 32.4Cr_\theta \leq 25.9 \qquad (5)$$

where $Mn_\theta$ in Formula (5) is to be substituted by a concentration of Mn (mass %) in cementite, and $Cr_\theta$ in Formula (5) is to be substituted by a concentration of Cr (mass %) in cementite.

Let FN5 be defined as $FN5=9.7Mn_\theta+32.4Cr_\theta$. FN5 is an index of a solution temperature of cementite in a steel material. As FN5 increases, the solution temperature of the cementite in the steel material is increased. Therefore, when the steel material is subjected to induction hardening, cementite is liable to be left unmelted, and a surface hardness of a hardened layer of the induction-hardened component is liable to vary. Accordingly, in the present embodiment, FN5 is to be 25.9 or less. In this case, a solution temperature of cementite in a steel material is sufficiently low, and as a result, the cementite in the steel material is sufficiently dissolved in induction hardening. Therefore, variations in a surface hardness of a hardened layer of the induction-hardened component are suppressed, and a roller-pitting fatigue strength and a bending fatigue strength of the induction-hardened component are increased.

(D) An amount of dissolved C in a steel material in high-frequency heating is influenced by a ferrite area fraction of the steel material. As described above, in induction hardening, a heating time is shorter than, for example, carburizing treatment using a heat treatment furnace. Therefore, a time of diffusion of C during heating the steel material is also short. In this case, a time of dissolution of carbides such as cementite is also short. As a result, a ferrite area fraction of the steel material is liable to increase. If a ferrite area fraction of a steel material is too high, an excess of ferrite remains in a structure after the induction hardening. An excessively high ferrite area fraction further causes production of low-carbon martensite. If ferrite remains or low-carbon martensite is produced, hardness varies in a surface of a hardened layer of the induction-hardened component.

Hence, the present inventors further investigated a relation between a ferrite area fraction of a steel material of which contents of elements in a chemical composition fall within the above-described ranges and a roller-pitting fatigue strength and a bending fatigue strength of an induction-hardened component produced by subjecting the steel material to induction hardening. As a result, the present inventors found that when a ferrite area fraction of a steel material is 40% or less, on the precondition that contents of elements in a chemical composition of the steel material fall within the above-described ranges and satisfy Formula (1) to Formula (5), variations in surface hardness can be suppressed in a hardened layer of an induction-hardened component produced by subjecting the steel material to induction hardening, and thus a roller-pitting fatigue strength and a bending fatigue strength of the induction-hardened component is increased.

If a ferrite area fraction of a steel material is more than 40%, even when contents of elements in its chemical composition fall within the above-described ranges and satisfy Formula (1) to Formula (5), ferrite can remain or low-carbon martensite can be produced in a hardened layer of the induction-hardened component. In this case, a surface hardness of the hardened layer of the induction-hardened component is liable to vary, and a roller-pitting fatigue strength and a bending fatigue strength of the induction-hardened component are decreased.

(E) By increasing a hardness of a steel material, a roller-pitting fatigue strength and a bending fatigue strength of an induction-hardened component produced by subjecting the steel material to induction hardening are increased. On the other hand, a machinability of the steel material is decreased.

A hardness of a steel material is influenced by contents of C, Si, Mn, Cr, V, and Mo. Then, when a hardness of a steel material is increased to some extent, a machinability of a steel material is significantly decreased. Therefore, to maintain a machinability of a steel material sufficiently, adjusting a hardness of the steel material within a proper range is effective. When the following Formula (2) is satisfied in the steel material according to the present embodiment, on the precondition that contents of elements in its chemical composition fall within the above-described ranges and satisfy Formula (1) and Formula (3) to Formula (5), and the steel material has a ferrite area fraction of 40% or less and a martensite area fraction of 10% or less, a sufficient machinability is obtained for the steel material while a roller-pitting fatigue strength and a bending fatigue strength of an induction-hardened component produced by subjecting the steel material to induction hardening are sufficiently increased.

$$C+(1/7)Si+(1/5)Mn+(1/9)Cr+V+(1/25)Mo \leq 0.900 \quad (2)$$

Here, each symbol of an element in Formula (2) is to be substituted by a content of a corresponding element (in mass %). When the corresponding element is not contained, the symbol of the element is to be substituted by "0".

Let FN2 be defined as $FN2=C+(1/7)Si+(1/5)Mn+(1/9)Cr+V+(1/25)Mo$. FN2 is an index of a hardness of a steel material. When FN2 is 0.900 or less, on the precondition that contents of elements in a chemical composition of the steel material fall within the above-described ranges and satisfy Formula (1) and Formula (3) to Formula (5), and the steel material has a ferrite area fraction of 40% or less and a martensite area fraction of 10% or less, a sufficient machinability is obtained for the steel material while a roller-pitting fatigue strength and a bending fatigue strength of an induction-hardened component produced by subjecting the steel material to induction hardening are sufficiently increased.

(F) As described above, out of induction-hardened components, an induction-hardened component used as a power transmitting part such as a pinion gear is desirably excellent in, of bending fatigue strength, both high-cycle bending fatigue strength and low-cycle bending fatigue strength.

In a steel material having the above-described chemical composition, boron (B) segregates in grain boundaries to enhance grain boundary strength. During use of an induction-hardened component, most of cracks occurring in the induction-hardened component expand from grain boundaries. Therefore, by increasing grain boundary strength with B, the expansion of cracks in grain boundaries can be suppressed. As a result, low-cycle bending fatigue strength is particularly increased for an induction-hardened component.

However, B is liable to combine with nitrogen (N) in a steel material. When N is present in a steel material, B combines with N to form BN. BN does not contribute to grain-boundary strengthening. Therefore, it is desirable to prevent B in a steel material from combining with N. Accordingly, the steel material according to the present embodiment further satisfies Formula (4).

$$Ti-4 \times N \geq 0 \quad (4)$$

Here, each symbol of an element in Formula (4) is to be substituted by a content of a corresponding element (in mass %).

Let FN4 be defined as $FN4=Ti-4 \times N$. FN4 is an index of grain-boundary strengthening by B. When FN4 is 0 or more, on the precondition that contents of elements in a chemical composition of a steel material fall within the above-described ranges and satisfy Formula (1) to Formula (3) and Formula (5), and the steel material has a ferrite area fraction of 40% or less, a low-cycle bending fatigue strength of an induction-hardened component produced by subjecting the steel material to induction hardening is sufficiently increased, and a sufficient machinability is obtained for the steel material, while a roller-pitting fatigue strength and a high-cycle bending fatigue strength of the induction-hardened component are sufficiently increased.

The steel material according to the present embodiment made based on the above-described findings has the following configuration.

[1] A steel material including a chemical composition containing, in mass %:

C: 0.40 to 0.70%,

Si: 0.15 to 2.10%,

Mn: 0.30 to 1.15%,

Cr: 0.01 to less than 0.50%,

S: 0.005 to 0.070%,

N: 0.0020 to 0.0200%,

Ti: 0.0080 to 0.2000%,

B: 0.0005 to 0.0050%,

Al: 0.005 to 0.100%, and

P: less than 0.050%, with the balance being Fe and impurities, and
satisfying Formula (1) to Formula (5), wherein
a ferrite area fraction is 40% or less, and a martensite area fraction is 10% or less:

$$290C+50Si+430 \geq 631.0 \quad (1)$$

$$C+(1/7)Si+(1/5)Mn+(1/9)Cr+V+(1/25)Mo \leq 0.900 \quad (2)$$

$$(1+0.7Si) \times (1+3.3333Mn) \times (1+2.16Cr) \times (1+3.00Mo) \times (1+1.73V) \times (1+0.365Cu) \times (1+0.363Ni) \times (2.616-1.6C) \geq 5.80 \quad (3)$$

$$Ti-4 \times N \geq 0 \quad (4)$$

$$9.7Mn_\theta + 32.4Cr_\theta \leq 25.9 \quad (5)$$

where each symbol of an element in Formula (1) to Formula (4) is to be substituted by a content of a corresponding element (mass %), and if the corresponding element is not contained, the symbol of an element is to be substituted by "0"; $Mn_\theta$ in Formula (5) is to be substituted by a concentration of Mn (mass %) in cementite, and $Cr_\theta$ in Formula (5) is to be substituted by a concentration of Cr (mass %) in cementite.

[2] The steel material according to [1], wherein
the chemical composition further contains, in lieu of a part of Fe, one or more types of element selected from the group consisting of:
Mo: 1.00% or less,
Ni: 1.00% or less, and
Cu; 1.00% or less.

[3] The steel material according to [1] or [2], wherein
the chemical composition further contains, in lieu of a part of Fe, one or more types of element selected from the group consisting of:
Ca: 0.0050% or less,
Mg: 0.0050% or less,
Te: 0.20% or less, and
rare earth metal: 0.0050% or less.

[4] The steel material according to any one of [1] to [3], wherein
the chemical composition further contains, in lieu of a part of Fe, one or more types selected from the group consisting of:
Zr: 0.0050% or less,
Nb: 0.20% or less, and
V: 0.35% or less.

[5] The steel material according to any one of [1] to [4], wherein
the chemical composition further contains, in lieu of a part of Fe,
Sb: 0.015% or less.

[6] The steel material according to any one of [1] to [5], wherein
the chemical composition further contains, in lieu of a part of Fe,
Pb: 0.09% or less.

[7] A component including
a hardened layer, and
a core portion inner than the hardened layer, wherein
the hardened layer has a martensite area fraction of 90% or more, and
the core portion has a chemical composition containing, in mass %:
C: 0.40 to 0.70%,
Si: 0.15 to 2.10%,
Mn: 0.30 to 1.15%,
Cr: 0.01 to less than 0.50%,
S: 0.005 to 0.070%,
N: 0.0020 to 0.0200%,
Ti: 0.0080 to 0.2000%,
B: 0.0005 to 0.0050%,
Al: 0.005 to 0.100%, and
P: less than 0.050%,
with the balance being Fe and impurities, and
satisfying Formula (1) to Formula (5), wherein
a ferrite area fraction is 40% or less, and a martensite area fraction is 10% or less:

$$290C+50Si+430 \geq 631.0 \quad (1)$$

$$C+(1/7)Si+(1/5)Mn+(1/9)Cr+V+(1/25)Mo \leq 0.900 \quad (2)$$

$$(1+0.7Si) \times (1+3.3333Mn) \times (1+2.16Cr) \times (1+3.00Mo) \times (1+1.73V) \times (1+0.365Cu) \times (1+0.363Ni) \times (2.616-1.6C) \geq 5.80 \quad (3)$$

$$Ti-4 \times N \geq 0 \quad (4)$$

$$9.7Mn_\theta + 32.4Cr_\theta \leq 25.9 \quad (5)$$

where each symbol of an element in Formula (1) to Formula (4) is to be substituted by a content of a corresponding element (mass %), $Mn_\theta$ in Formula (5) is to be substituted by a concentration of Mn (mass %) in cementite, and $Cr_\theta$ in Formula (5) is to be substituted by a concentration of Cr (mass %) in cementite.

[8] The component according to [7], wherein
the chemical composition further contains, in lieu of a part of Fe, one or more types of element selected from the group consisting of:
Mo: 1.00% or less,
Ni: 1.00% or less, and
Cu: 1.00% or less.

[9] The component according to [7] or [8], wherein
the chemical composition further contains, in lieu of a part of Fe, one or more types of element selected from the group consisting of:
Ca: 0.0050% or less,
Mg: 0.0050% or less,
Te: 0.20% or less, and
rare earth metal: 0.0050% or less.

[10] The component according to any one of [7] to [9], wherein
the chemical composition further contains, in lieu of a part of Fe, one or more types of element selected from the group consisting of:
Zr: 0.0050% or less,
Nb: 0.20% or less, and
V: 0.35% or less.

[11] The component according to any one of [7] to [10], wherein
the chemical composition further contains, in lieu of a part of Fe, Sb: 0.015% or less.

[12] The component according to any one of [7] to [11], wherein
the chemical composition further contains, in lieu of a part of Fe,
Pb: 0.09% or less.

The steel material according to the present embodiment and an induction-hardened component produced by subjecting the steel material to induction hardening will be described below in detail. In the following description, the symbol "%" relating to element means mass % unless otherwise stated.

The steel material according to the present embodiment is to be a starting material of an induction-hardened component. A component produced by subjecting the steel material according to the present embodiment to induction hardening will be herein referred to as an "induction-hardened component". An induction-hardened component is suitable for a component that is required to have a high roller-pitting fatigue strength and a high bending fatigue strength.

[Steel Material]
[Chemical Composition of Steel Material]

The steel material according to the present embodiment is a steel material to be a starting material of an induction-hardened component. A chemical composition of the steel material according to the present embodiment contains the following elements.

C: 0.40 to 0.70%

Carbon (C) increases a roller-pitting fatigue strength and a bending fatigue strength of an induction-hardened component produced by subjecting the steel material to induction hardening. In addition, C decreases a ferrite area fraction of the steel material. In this case, a hardenability in induction hardening can be increased, and a depth of a hardened layer of the induction-hardened component can be increased. As a result, a roller-pitting fatigue strength and a bending fatigue strength of the induction-hardened component are increased. If a content of C is less than 0.40%, this effect cannot be obtained sufficiently even when contents of the other elements fall within the ranges according to the present embodiment. On the other hand, if the content of C is more than 0.70%, machinability is decreased even when contents of the other elements fall within the ranges according to the present embodiment. Therefore, the content of C is to be 0.40 to 0.70%. A lower limit of the content of C is preferably 0.42%, more preferably 0.45%, still more preferably 0.48%, even still more preferably 0.50%, and even still more preferably 0.55%. An upper limit of the content of C is preferably 0.68%, more preferably 0.66%.

Si: 0.15 to 2.10%

Silicon (Si) increases a temper softening resistance of a hardened layer of an induction-hardened component produced by subjecting the steel material to induction hardening. As a result, a roller-pitting fatigue strength of the induction-hardened component is increased. If a content of Si is less than 0.15%, this effect cannot be obtained sufficiently even when contents of the other elements fall within the ranges according to the present embodiment. On the other hand, if the content of Si is more than 2.10%, decarburization is liable to occur in induction hardening even when contents of the other elements fall within the ranges according to the present embodiment. In this case, a roller-pitting fatigue strength and a bending fatigue strength of the induction-hardened component are decreased. Therefore, the content of Si is to be 0.15 to 2.10%. A lower limit of the content of Si is preferably 0.25%, more preferably 0.35%, still more preferably 0.40%, even still more preferably 0.45%, even still more preferably 0.50%, even more preferably 0.51%, even still more preferably 0.60%, even still more preferably 0.65%, and even still more preferably 0.71%. An upper limit of the content of Si is preferably 2.00%, more preferably 1.95%, still more preferably 1.86%, and even still more preferably 1.80%.

Mn: 0.30 to 1.15%

Manganese (Mn) increases a hardenability of steel. In addition, Mn combines with sulfur (S) in the steel material to form MnS, increasing a machinability of the steel material. Mn further immobilizes S to make S harmless, increasing a hot workability of the steel material. If a content of Mn is less than 0.30%, this effect cannot be obtained sufficiently even when contents of the other elements fall within the ranges according to the present embodiment. On the other hand, if the content of Mn is more than 1.15%, a hardness of the steel material becomes excessively high even when contents of the other elements fall within the ranges according to the present embodiment. In this case, a machinability of the steel material is decreased. A content of Mn being more than 1.15% further causes Mn in cementite in the steel material to be dissolved, increasing a solution temperature of the cementite. In this case, the cementite in the steel material is not dissolved sufficiently in an induction hardening process, and the cementite is partly left unmelted. As a result, a surface hardness of a hardened layer of the induction-hardened component varies, and a roller-pitting fatigue strength and a bending fatigue strength of the induction-hardened component are decreased. Therefore, the content of Mn is to be 0.30 to 1.15%. A lower limit of the content of Mn is preferably 0.35%, more preferably 0.38%, still more preferably 0.40%, even still more preferably 0.45%, even still more preferably 0.50%, even still more preferably 0.55%, even still more preferably 0.60%, and even still more preferably 0.65%. An upper limit of the content of Mn is preferably 1.10% or less, more preferably 1.05%, still more preferably 1.00% or less, still more preferably 0.95%.

Cr: 0.01 to Less than 0.50%

Chromium (Cr) increases a hardenability of steel. In addition, Cr increases a hot workability of steel. If a content of Cr is less than 0.01%, this effect cannot be obtained sufficiently even when contents of the other elements fall within the ranges according to the present embodiment. On the other hand, if the content of Cr is 0.50% or more, an excess of Cr is dissolved in cementite in the steel material, increasing a solution temperature of the cementite in the steel material even when contents of the other elements fall within the ranges according to the present embodiment. In this case, the cementite in the steel material is not dissolved sufficiently in an induction hardening process, and the cementite is partly left umnelted. As a result, a surface hardness of a hardened layer of the induction-hardened component varies, and a roller-pitting fatigue strength and a bending fatigue strength of the induction-hardened component are decreased. If the content of Cr is less than 0.01%, this effect cannot be obtained sufficiently. On the other hand, if the content of Cr is 0.50% or more, a hardness of the steel material becomes excessively high even when contents of the other elements fall within the ranges according to the present embodiment. In this case, a machinability of the steel material is decreased. Therefore, the content of Cr is to be 0.01 to less than 0.50%. A lower limit of the content of Cr is preferably 0.02%, more preferably 0.03%, still more preferably 0.05%, even still more preferably 0.07%, and even still more preferably 0.10%. An upper limit of the content of Cr is preferably 0.45%, more preferably 0.40%, still more preferably 0.35%, even still more preferably 0.32%, and even still more preferably 0.30%.

S: 0.005 to 0.070%

Sulfur (S) combines with Mn in the steel material to form MnS, increasing a machinability of the steel material. If a content of S is less than 0.005%, this effect cannot be obtained sufficiently even when contents of the other elements fall within the ranges according to the present embodiment. On the other hand, if the content of S is more than 0.070%, a bending fatigue strength of the induction-hardened component is decreased even when contents of the other elements fall within the ranges according to the present embodiment. Furthermore, if the content of S is more than 0.070%, when the induction-hardened component is subjected to a magnetic particle testing, a surface of the induction-hardened component is liable to show a false indication, which decreases an accuracy of the testing. Therefore, the content of S is to be 0.005% to 0.070%. A lower limit of the content of S is preferably 0.007%, more preferably 0.010%, still more preferably 0.012%, and even still more preferably 0.014%. An upper limit of the content of S is preferably 0.065%, more preferably 0.060%, still more preferably 0.055%, even still more preferably 0.050%, even still more preferably 0.045%, even still more preferably 0.040%, even still more preferably 0.035%, and even still more preferably 0.030%.

N: 0.0020 to 0.0200%

Nitride (N) combines with nitride-forming elements such as Al in the steel material to form nitrides. Nitride performs grain refinement on austenite in an induction hardening process. As a result, a bending fatigue strength of the induction-hardened component is increased. If a content of N is less than 0.0020%, this effect cannot be obtained sufficiently even when contents of the other elements fall within the ranges according to the present embodiment. On the other hand, if the content of N is more than 0.0200%, a hot workability of the steel material is decreased even when contents of the other elements fall within the ranges according to the present embodiment. Therefore, the content of N is to be 0.0020 to 0.0200%. A lower limit of the content of N is preferably 0.0025%, more preferably 0.0030%, still more preferably 0.0033%, even still more preferably 0.0035%, and even still more preferably 0.0038%. An upper limit of the content of N is preferably 0.0195%, more preferably 0.0150%, still more preferably 0.0130%, and even still more preferably 0.0100%.

Ti: 0.0080 to 0.2000%

Titanium (Ti) combines with N to form its nitride. This prevents B and N from combining together to form B nitride. In this case, B segregates in grain boundaries to increase grain boundary strength. As a result, a low-cycle bending fatigue strength of the induction-hardened component is particularly increased. If a content of Ti is less than 0.008%, this effect cannot be obtained sufficiently even when contents of the other elements fall within the ranges according to the present embodiment. On the other hand, if the content of Ti is more than 0.2000%, the steel material is embrittled to decrease in hot workability even when contents of the other elements fall within the ranges according to the present embodiment. Therefore, the content of Ti is to be 0.0080 to 0.2000%. A lower limit of the content of Ti is preferably 0.0085%, more preferably 0.0090%, still more preferably 0.0095%, even still more preferably 0.0100%, even still more preferably 0.0150%, and even still more preferably 0.0200%. An upper limit of the content of Ti is preferably 0.1900%, more preferably 0.1850%, still more preferably 0.1800%, even still more preferably 0.1700%, even still more preferably 0.1500%, even still more preferably 0.1000%, and even still more preferably 0.0600%.

B: 0.0005 to 0.0050%

Boron (B) segregates in a form of dissolved B in grain boundaries in the steel material, increasing grain boundary strength. In this case, a low-cycle bending fatigue strength of the induction-hardened component is particularly increased. If a content of B is less than 0.0005%, this effect cannot be obtained sufficiently even when contents of the other elements fall within the ranges according to the present embodiment. On the other hand, if the content of B is more than 0.0050%, the steel material is embrittled even when contents of the other elements fall within the ranges according to the present embodiment. In this case, hot workability is decreased. Therefore, the content of B is to be 0.0005 to 0.0050%. A lower limit of the content of B is preferably 0.0007%, more preferably 0.0010%, still more preferably 0.0012%, and even still more preferably 0.0014%. An upper limit of the content of B is preferably 0.0045%, more preferably 0.0040%, still more preferably 0.0035%, even still more preferably 0.0030%, and even still more preferably 0.0028%.

Al: 0.005 to 0.100%

Aluminum (Al) combines with N to form its nitride. Nitride performs grain refinement on austenite in an induction hardening process. As a result, a bending fatigue strength of the induction-hardened component is increased. In addition, Al increases a hardenability of the steel material. Accordingly, a depth of a hardened layer of the induction-hardened component is increased. In addition, Al increases a machinability of the steel material. If a content of Al is less than 0.005%, this effect cannot be obtained sufficiently even when contents of the other elements fall within the ranges according to the present embodiment. On the other hand, if the content of Al is more than 0.100%, austenite transformation is difficult to complete during high-frequency heating in an induction hardening process even when contents of the other elements fall within the ranges according to the present embodiment. In this case, a hardenability of the steel material is decreased. As a result, a roller-pitting fatigue strength and a bending fatigue strength of the induction-hardened component are decreased. Therefore, the content of Al is to be 0.005 to 0.100%. A lower limit of the content of Al is preferably 0.010%, more preferably 0.012%, still more preferably 0.015%, even still more preferably 0.018%, and even still more preferably 0.020%. An upper limit of the content of Al is preferably 0.090%, more preferably 0.080%, still more preferably 0.070%, even still more preferably 0.060%, and even still more preferably 0.050%.

P: Less than 0.050%

Phosphorus (P) is an impurity contained unavoidably. In other words, a content of P is more than 0%. P decreases a toughness of the steel material. If the content of P is 0.050% or more, a toughness of the steel material is significantly decreased even when contents of the other elements fall within the ranges according to the present embodiment. A content of P being 0.050% or more further accelerates propagation of a crack occurring in the induction-hardened component when the induction-hardened component is used. In this case, a bending fatigue strength of the induction-hardened component is decreased. Therefore, the content of P is to be less than 0.050%. An upper limit of the content of P is preferably 0.045%, more preferably 0.040%, and still more preferably 0.035%. The content of P is preferably as low as possible. However, dephosphorization treatment is time and cost consuming. Therefore, with consideration given to industrial productivity, a lower limit of the content of P is preferably 0.001%, more preferably 0.002%, and still more preferably 0.005%.

The balance of the chemical composition of the steel material according to the present embodiment is Fe and impurities. The impurities herein mean those that are mixed in the steel material from ores and scraps as raw materials or from a production environment in producing the steel material industrially, and that are allowed to be in the steel material within ranges in which the impurities have no adverse effect on the steel material according to the present embodiment.

[Optional Elements]

The steel material according to the present embodiment may further contain, in lieu of a part of Fe, one or more types of element selected from the group consisting of Mo, Ni, and Cu. Each of these elements increases a hardenability of the steel material.

Mo: 1.00% or Less

Molybdenum (Mo) is an optional element and need not be contained. In other words, a content of Mo may be 0%. When contained, that is, when the content of Mo is more than 0%, Mo increases a hardenability of the steel material. In addition, Mo increases a temper softening resistance of a hardened layer of the induction-hardened component and increases a roller-pitting fatigue strength of the induction-hardened component. A trace amount of Mo contained provides the above effects to some extent. However, if the content of Mo is more than 1.00%, the effects level off even when contents of the other elements fall within the ranges according to the present embodiment. Therefore, the content of Mo is to be 1.00% or less. In other words, the content of Mo is to be 0 to 1.00%. A lower limit of the content of Mo is preferably 0.01%, more preferably 0.05%, and still more preferably 0.10%. An upper limit of the content of Mo is preferably less than 0.60%, more preferably 0.40%, and still more preferably 0.30%.

Ni: 1.00% or Less

Nickel (Ni) is an optional element and need not be contained. In other words, a content of Ni may be 0%. When contained, that is, when the content of Ni is more than 0%, Ni increases a hardenability of the steel material. In addition, Ni is concentrated on a surface of the steel material when being oxidized, preventing an oxidation reaction of the steel material. A trace amount of Ni contained provides the above effects to some extent. However, if the content of Ni is more than 1.00%, a machinability of the steel material is decreased even when contents of the other elements fall within the ranges according to the present embodiment. Therefore, the content of Ni is to be 1.00% or less. In other words, the content of Ni is to be 0 to 1.00%. A lower limit of the content of Ni is preferably 0.01%, more preferably 0.05%, and still more preferably 0.10%. An upper limit of the content of Ni is preferably 0.80%, and more preferably 0.60%.

Cu: 1.00% or Less

Copper (Cu) is an optional element and need not be contained. In other words, a content of Cu may be 0%. When contained, that is, when the content of Cu is more than 0%, Cu is concentrated on a surface of the steel material when being oxidized, preventing an oxidation reaction of the steel material. A trace amount of Cu contained provides the above effects to some extent. However, if the content of Cu is more than 1.00%, a hot workability of the steel material is decreased even when contents of the other elements fall within the ranges according to the present embodiment. Therefore, the content of Cu is to be 1.00% or less. In other words, the content of Cu is to be 0 to 1.00%. A lower limit of the content of Cu is preferably 0.01%, more preferably 0.05%, and still more preferably 0.10%. An upper limit of the content of Cu is preferably 0.80%, and more preferably 0.60%.

The steel material according to the present embodiment may further contain, in lieu of a part of Fe, one or more types of element selected from the group consisting of Ca, Mg, Te, and rare earth metal (REM). Each of these elements increases high-cycle bending fatigue strength.

Ca: 0.0050% or Less

Calcium (Ca) is an optional element and need not be contained. In other words, a content of Ca may be 0%. When contained, that is, when the content of Ca is more than 0%, Ca is dissolved in MnS to refine MnS, preventing MnS from elongating. As a result, a bending fatigue strength of the induction-hardened component is increased. A trace amount of Ca contained provides the above effects to some extent. However, if the content of Ca is more than 0.0050%, a hot workability of the steel material is decreased. Therefore, the content of Ca is to be 0.0050% or less. In other words, the content of Ca is to be 0 to 0.0050%. A lower limit of the content of Ca is preferably 0.0001%, more preferably 0.0003%, and still more preferably 0.0005%. An upper limit of the content of Ca is preferably 0.0045%, more preferably 0.0040%, still more preferably 0.0030%, and even still more preferably 0.0025%.

Mg: 0.0050% or Less

Magnesium (Mg) is an optional element and need not be contained. In other words, a content of Mg may be 0%. When contained, that is, when the content of Mg is more than 0%, Mg is dissolved in MnS to refine MnS, preventing MnS from elongating. As a result, a bending fatigue strength of the induction-hardened component is increased. A trace amount of Mg contained provides the above effects to some extent. However, if the content of Mg is more than 0.0050%, a hot workability of the steel material is decreased. Therefore, the content of Mg is to be 0.0050% or less. In other words, the content of Mg is to be 0 to 0.0050%. A lower limit of the content of Mg is preferably 0.0001%, more preferably 0.0003%, and still more preferably 0.0005%. An upper limit of the content of Mg is preferably 0.0048%, more preferably 0.0040%, still more preferably 0.0030%, and even still more preferably 0.0025%.

Te: 0.20% or Less

Tellurium (Te) is an optional element and need not be contained. In other words, a content of Te may be 0%. When contained, that is, when the content of Te is more than 0%, Te is dissolved in MnS to refine MnS, preventing MnS from elongating. As a result, a bending fatigue strength of the induction-hardened component is increased. A trace amount of Te contained provides the above effects to some extent. However, if the content of Te is more than 0.20%, a hot workability of the steel material is decreased. Therefore, the content of Te is to be 0.20% or less. In other words, the content of Te is to be 0 to 0.20%. A lower limit of the content of Te is preferably 0.01%, more preferably 0.02%, and still more preferably 0.05%. An upper limit of the content of Te is preferably 0.18%, more preferably 0.15%, and still more preferably 0.10%.

Rare Earth Metal (REM): 0.0050% or Less

Rare earth metal (REM) is an optional element and need not be contained. In other words, a content of REM may be 0%. When contained, that is, when the content of REM is more than 0%, REM is dissolved in MnS to refine MnS, preventing MnS from elongating. As a result, a bending fatigue strength of the induction-hardened component is increased. A trace amount of REM contained provides the above effects to some extent. However, if the content of REM is more than 0.0050%, formation of complex oxides including oxides and sulfides is accelerated, and the complex oxides coarsen even when contents of the other elements fall within the ranges according to the present embodiment. In this case, a bending fatigue strength of the induction-hardened component is decreased. Therefore, the content of REM is to be 0.0050% or less. In other words, the content of REM is to be 0 to 0.0050%. A lower limit of the content of REM is preferably 0.0001%, more preferably 0.0003%, and still more preferably 0.0005%. An upper limit of the content of REM is preferably 0.0045%, more preferably 0.0040%.

Note that REM herein refers to one or more elements selected from the group consisting of scandium (Sc) with atomic number 21, yttrium (Y) with atomic number 39, and lanthanoid, which includes lanthanum (La) with atomic number 57 to lutetium (Lu) with atomic number 71. The content of REM used herein refers to a total content of these elements.

The steel material to be subjected to induction hardening according to the present embodiment may further contain, in lieu of a part of Fe, one or more types of element selected from the group consisting of Zr, Nb, and V.

Zr: 0.0050% or Less

Zirconium (Zr) is an optional element and need not be contained. In other words, a content of Zr may be 0%. When contained, that is, when the content of Zr is more than 0%, Zr combines with N to form its nitride. This nitride performs grain refinement on austenite in an induction hardening process. As a result, a bending fatigue strength of the induction-hardened component is increased. A trace amount of Zr contained provides the above effect to some extent. However, if the content of Zr is more than 0.0050%, coarse precipitates are formed, and the bending fatigue strength of the induction-hardened component is rather decreased even when contents of the other elements fall within the ranges according to the present embodiment. A content of Zr being more than 0.0050% further causes embrittlement of the steel material. Therefore, the content of Zr is to be 0.0050% or less. In other words, the content of Zr is to be 0 to 0.0050%. A lower limit of the content of Zr is preferably 0.0001%, more preferably 0.0003%, still more preferably 0.0005%, and even still more preferably 0.0010%. An upper limit of the content of Zr is preferably 0.0048%, more preferably 0.0045%, and still more preferably 0.0040%.

Nb: 0.20% or Less

Niobium (Nb) is an optional element and need not be contained. In other words, a content of Nb may be 0%. When contained, that is, when the content of Nb is more than 0%, Nb combines with N to form its nitride. This nitride performs grain refinement on austenite in an induction hardening process. As a result, a bending fatigue strength of the induction-hardened component is increased. A trace amount of Nb contained provides the above effect to some extent. However, when the content of Nb is more than 0.20%, the effect levels off. Therefore, the content of Nb is to be 0.20% or less. In other words, the content of Nb is to be 0 to 0.20%. A lower limit of the content of Nb is preferably 0.01%, more preferably 0.02%, and still more preferably 0.05%. An upper limit of the content of Nb is preferably 0.19%, more preferably 0.18%, and still more preferably 0.15%.

V: 0.35% or Less

Vanadium (V) is an optional element and need not be contained. In other words, a content of V may be 0%. When contained, that is, when the content of V is more than 0%, V combines with N to form its nitride. This nitride performs grain refinement on austenite in an induction hardening process. As a result, a bending fatigue strength of the induction-hardened component is increased. A trace amount of the content of Zr contained provides the above effect to some extent. However, when the content of V is more than 0.35%, the effect levels off. Therefore, the content of V is 0.35% or less. In other words, the content of V is to be 0 to 0.35%. A lower limit of the content of V is preferably 0.01%, more preferably 0.02%, and still more preferably 0.05%. An upper limit of the content of V is preferably 0.30%, and more preferably 0.25%.

The steel material to be subjected to induction hardening according to the present embodiment may further contain Sb, in lieu of a part of Fe.

Sb: 0.015% or Less

Antimony (Sb) is an optional element and need not be contained. In other words, a content of Sb may be 0%. When contained, that is, when the content of Sb is more than 0%, Sb segregates on a surface of the steel material, preventing oxidation of the steel material. A trace amount of Sb contained provides the above effects to some extent. However, if the content of Sb is more than 0.015%, a toughness and a hot workability of the steel material are decreased. Therefore, the content of Sb is 0.015% or less. In other words, the content of Sb is to be 0 to 0.015%. A lower limit of the content of Sb is preferably 0.001%, more preferably 0.003%, and still more preferably 0.005%. An upper limit of the content of Sb is preferably 0.014%, more preferably 0.010%, and still more preferably 0.008%.

The steel material to be subjected to induction hardening according to the present embodiment may further contain Pb, in lieu of a part of Fe.

Pb: 0.09% or Less

Lead (Pb) is an optional element and need not be contained. In other words, a content of Pb may be 0%. When contained, Pb increases a machinability of the steel material. A trace amount of Pb contained provides the above effects to some extent. However, if the content of Pb is more than 0.09%, a toughness and a hot workability of the steel material are decreased. Therefore, the content of Pb is 0.09% or less. In other words, the content of Pb is to be 0 to 0.09%. A lower limit of the content of Pb is preferably 0.01%, and more preferably 0.02%. An upper limit of the content of Pb is preferably 0.08%, and more preferably 0.07%.

[Formula (1) to Formula (5)]

In the chemical composition of the steel material according to the present embodiment, contents of elements fall within the above-described ranges and satisfy the following Formula (1) to Formula (5).

$$290C+50Si+430 \geq 631.0 \tag{1}$$

$$C+(1/7)Si+(1/5)Mn+(1/9)Cr+V+(1/25)Mo \leq 0.900 \tag{2}$$

$$(1+0.7Si) \times (1+3.3333Mn) \times (1+2.16Cr) \times (1+3.00Mo) \times \\ (1+1.73V) \times (1+0.365Cu) \times (1+0.363Ni) \times (2.616- \\ 1.6C) \geq 5.80 \tag{3}$$

$$Ti-4 \times N \geq 0 \tag{4}$$

$$9.7Mn_\theta + 32.4Cr_\theta \leq 25.9 \tag{5}$$

where each symbol of an element in Formula (1) to Formula (4) is to be substituted by a content of a corresponding element (mass %), and if the corresponding element is not contained, the symbol of an element is to be substituted by "0"; $Mn_\theta$ in Formula (5) is to be substituted by a concentration of Mn (mass %) in cementite, and $Cr_\theta$ in Formula (5) is to be substituted by a concentration of Cr (mass %) in cementite.

Formula (1) to Formula (5) will be described below.

[Formula (1)]

The steel material according to the present embodiment satisfies Formula (1).

$$290C+50Si+430 \geq 631.0 \tag{1}$$

where, each symbol of an element in Formula (1) is to be substituted by a content of a corresponding element (in mass %).

Let FN1 be defined as FN1=290C+50Si+430. FN1 is an index of a hardness of a steel surface. FN1 is equivalent substantially to a Vickers hardness of a surface of an induction-hardened component that is subjected to induction hardening and then tempering at 300° C. (300° C.-tempered hardness). A roller-pitting fatigue strength of an induction-hardened component has a positive correlation with 300° C.-tempered hardness. Therefore, when the 300° C.-tempered hardness is sufficiently increased, the induction-hardened component exerts an excellent roller-pitting fatigue strength. When FN1 is 631.0 or more, on the precondition that the contents of the elements in the chemical composition of the steel material fall within the ranges according to the present embodiment and satisfy Formula (2) to Formula (5), and the steel material has a ferrite area fraction of 40% or less, a sufficient roller-pitting fatigue strength is obtained for an induction-hardened component produced by subjecting the steel material to induction hardening. On the other hand, if FN1 is less than 631.0, the roller-pitting fatigue strength of the induction-hardened component is decreased, and pitting may occur. Therefore, FN1 is to be 631.0 or more. A lower limit of FN1 is preferably 635.0, more preferably 638.0, still more preferably 640.0, even still more preferably 642.0, and even still more preferably 644.0. An upper limit of FN1 is not limited to a specific value. However, in the case of the chemical composition described above, an upper limit of FN1 is preferably 738.0, more preferably 700.0, still more preferably 680.0, and even still more preferably 665.0.

[Formula (2)]

The steel material according to the present embodiment further satisfies Formula (2).

$$C+(1/7)Si+(1/5)Mn+(1/8)Cr+V+(1/25)Mo \leq 0.900 \quad (2)$$

where, each symbol of an element in Formula (2) is to be substituted by a content of a corresponding element (in mass %). When the corresponding element is not contained, the symbol of the element is to be substituted by "0".

Let FN2 be defined as FN2=C+(1/7)Si+(1/5)Mn+(1/8)Cr+V+(1/25)Mo. FN2 is an index of a hardness of a steel material. If FN2 is more than 0.900, a machinability of the steel material is decreased. When FN2 is 0.900 or less, on the precondition that contents of elements in a chemical composition of a steel material fall within the above-described ranges and satisfy Formula (1) and Formula (3) to Formula (5), and the steel material has a ferrite area fraction of 40% or less, a machinability of the steel material is sufficiently increased. Therefore, FN2 is to be 0.900 or less. An upper limit of FN2 is preferably 0.895, more preferably 0.890, and still more preferably 0.885. A lower limit of FN2 is preferably 0.483, more preferably 0.600, still more preferably 0.700, even still more preferably 0.750, and even still more preferably 0.800.

[Formula (3)]

The steel material according to the present embodiment further satisfies Formula (3).

$$(1+0.7Si) \times (1+3.33331Mn) \times (1+2.16Cr) \times (1+3.00Mo) \times (1+1.73V) \times (1+0.365Cu) \times (1+0.363Ni) \times (2.616-1.6C) \geq 5.80 \quad (3)$$

where, each symbol of an element in Formula (3) is to be substituted by a content of a corresponding element (in mass %). When the corresponding element is not contained, the symbol of the element is to be substituted by "0".

Let FN3 be defined as FN3=(1+0.7Si)×(1+3.3333Mn)×(1+2.16Cr)×(1+3.00Mo)×(1+1.73V)×(1+0.365Cu)×(1+0.363Ni)×(2.616−1.6C). FN3 is an index of a hardenability of a steel material. If FN3 is less than 5.80, a hardenability of the steel material is insufficient. In this case, non-martensitic structures are formed in a hardened layer of the induction-hardened component. As a result, a roller-pitting fatigue strength and a bending fatigue strength of the induction-hardened component are decreased. When FN3 is 5.80 or more, on the precondition that the contents of the elements in the chemical composition fall within the above-described ranges and satisfy Formula (1), Formula (2), Formula (4), and Formula (5), and the steel material has a ferrite area fraction of 40% or less, a sufficient roller-pitting fatigue strength and a sufficient bending fatigue strength is obtained for the induction-hardened component. A lower limit of FN3 is preferably 5.85, more preferably 5.90, still more preferably 5.95, even still more preferably 6.00, and even still more preferably 6.05. An upper limit of FN3 is preferably 70.00, more preferably 60.00, still more preferably 50.00, even still more preferably 45.00, even still more preferably 40.00, and even still more preferably 35.00.

[Formula (4)]

The steel material according to the present embodiment further satisfies Formula (4).

$$Ti-4 \times N \geq 0 \quad (4)$$

where, each symbol of an element in Formula (4) is to be substituted by a content of a corresponding element (in mass %).

Let FN4 be defined as FN4=Ti−4×N. FN4 is an index of grain-boundary strengthening by B. If FN4 is less than 0, an amount of Ti for immobilizing N is not sufficient. In this case, N combines with B to form BN, reducing an amount of dissolved B. As a result, grain-boundary strengthening by dissolved B is not sufficient, and a low-cycle bending fatigue strength of the induction-hardened component is particularly decreased. On the other hand, when FN4 is 0 or more, on the precondition that the contents of the elements in the chemical composition fall within the above-described ranges and satisfy Formula (1) to Formula (3) and Formula (5), and the steel material has a ferrite area fraction of 40% or less, a low-cycle bending fatigue strength of an induction-hardened component produced by subjecting the steel material to induction hardening is sufficiently increased, while a roller-pitting fatigue strength and a high-cycle bending fatigue strength of the induction-hardened component are sufficiently increased. A lower limit of FN4 is preferably 0.001, more preferably 0.002, and still more preferably 0.003.

[Formula (5)]

The steel material according to the present embodiment further satisfies Formula (5).

$$9.7Mn_\theta + 32.4Cr_\theta \leq 25.9 \quad (5)$$

where, $Mn_\theta$ in Formula (5) is to be substituted by a concentration of Mn (mass %) in cementite. $Cr_\theta$ in Formula (5) is to be substituted by a concentration of Cr (mass %) in cementite.

Let FN5 be defined as FN5=9.7Mn$_\theta$+32.4Cr$_\theta$. FN5 is an index of a solution temperature of cementite in a steel material. As FN5 increases, the solution temperature of the cementite in the steel material is increased. Therefore, when the steel material is subjected to induction hardening, cementite is liable to be left unmelted, and a surface hardness of a hardened layer of the induction-hardened component is liable to vary. If FN5 is more than 25.9, a solution temperature of cementite in the steel material is increased excessively. Therefore, a surface hardness of a hardened layer of the induction-hardened component is liable to vary. As a result, a roller-pitting fatigue strength and a bending fatigue strength of the induction-hardened component are not obtained sufficiently. On the other hand, if FN5 is 25.9 or less, a solution temperature of cementite in the steel material is sufficiently low, and as a result, the cementite in the steel material is sufficiently dissolved in induction hardening. Therefore, variations in a surface hardness of a hardened layer of the induction-hardened component are suppressed, and a roller-pitting fatigue strength and a bending fatigue strength of the induction-hardened component are sufficiently increased. Therefore, FN5 is 25.9 or less.

An upper limit of FN15 is preferably 22.0, more preferably 21.0, and still more preferably 20.0. A lower limit of FN5 is preferably 1.0, more preferably 1.5, still more preferably 2.0, and even still more preferably 2.5.

[Method for Measuring Concentration of Mn and Concentration of Cr in Cementite]

A concentration of Mn (mass %) and a concentration of Cr (mass %) in cementite in the steel material are measured using residues of electroextraction. Specifically, the measurement is performed by the method described below. A test specimen is extracted from any location of the steel material. The test specimen is subjected to constant current electrolysis using 10%-AA-based electrolyte. The 10%-AA-based electrolyte means a solution that is made by mixing tetramethylammonium chloride, acetylacetone, and methanol in a ratio of 1:10:100 in volume fraction.

After the constant-current electrolysis, suction filtration is performed with a filter having a mesh size of 0.2 μm to extract residues. The extracted residues are subjected to an acid decomposition process. After the acid decomposition process, the inductively coupled plasma atomic emission spectroscopy (ICP-AES) is performed to measure masses of Fe, Cr, and Mn in the residues. In the residues, an amount of metal carbides is negligibly small. Therefore, the residues are assumed to be entirely $M_3C$ carbide, that is, cementite. Based on the obtained mass of Fe, mass of Cr, and mass of Mn in the residues, with cementite being assumed to be 100 mass %, $Mn_\theta$ (mass %) and $Cr_\theta$ (mass %), a concentration of Mn and a concentration of Cr dissolved in the cementite, are calculated.

[Microstructure in Steel Material]

Furthermore, in the steel material according to the present embodiment, in its microstructure, a ferrite area fraction is 40% or less, and a martensite area fraction is 10% or less. An amount of dissolved C in a steel material in high-frequency heating is influenced by a ferrite area fraction of the steel material. In induction hardening, a heating time is shorter than, for example, carburizing treatment using a heat treatment furnace. Therefore, a time of diffusion of C during heating the steel material is also short. In this case, a time of dissolution of carbides such as cementite is also short. As a result, a ferrite area fraction of the steel material is liable to increase. If a ferrite area fraction of a steel material is too high, an excess of ferrite remains in a structure after the induction hardening. An excessively high ferrite area fraction further causes production of low-carbon martensite in the structure after the induction hardening. If ferrite remains or low-carbon martensite is produced, hardness varies in a surface of a hardened layer of the induction-hardened component. If a ferrite area fraction of the steel material is more than 40%, hardness varies in a surface of a hardened layer of the induction-hardened component. As a result, a roller-pitting fatigue strength and a bending fatigue strength of the hardened layer of the induction-hardened component are decreased. On the other hand, when the ferrite area fraction is 40% or less, on the precondition that the contents of the elements in the chemical composition of the steel material fall within the above-described ranges and satisfy Formula (1) to Formula (5), variations in surface hardness can be suppressed sufficiently in a hardened layer of an induction-hardened component produced by subjecting the steel material to induction hardening. As a result, a roller-pitting fatigue strength and a bending fatigue strength of the induction-hardened component are sufficiently increased.

Note that the above-described ferrite area fraction (%) means an area fraction (%) of polygonal ferrite. In the present embodiment, the balance of the microstructure other than ferrite is martensite and/or pearlite. An area fraction of the martensite is 10% or less. When an area fraction of martensite is 10% or less, the steel material can be prevented from becoming hard excessively. Therefore, decrease in a machinability of the steel material can be prevented. As used herein, "martensite" includes martensite as well as bainite. In microstructure observation, it is extremely difficult to distinguish between martensite and bainite. Therefore, martensite and bainite are herein referred to as "martensite". An upper limit of the martensite area fraction is preferably 7%, more preferably 5%, and still more preferably 4%.

[Method for Measuring Ferrite Area Fraction and Martensite Area Fraction]

A ferrite area fraction (%) of the steel material can be determined by the following method. A test specimen for microstructure observation is extracted from any location of the steel material. Out of surfaces of the test specimen, a cross section of the steel material that is perpendicular to a longitudinal direction (axial direction) of the steel material (hereinafter, referred to as an observation surface) is polished. The polished observation surface is etched with Nital etchant. The etched observation surface is observed under an optical microscope with 400× magnification, and photographic images are created. In the photographic images, ferrite is identified. Specifically, phases each having a lamella structure can be identified as pearlite. Regions each having a brightness higher than that of pearlite (white regions) can be identified as ferrite. Regions each having a brightness lower than that of ferrite and pearlite (dark regions) can be identified as martensite. An area fraction of the identified ferrite is measured by the point counting method conforming to JIS G 0555(2003). The measured area fraction is defined as the ferrite area fraction (%) of the steel material. In addition, an area fraction of the identified martensite is measured by the above-described point counting method. The measured area fraction is defined as the martensite area fraction (%) of the steel material.

The steel material according to the present embodiment includes a chemical composition in which contents of elements fall within the ranges according to the present embodiment and satisfy Formula (1) to Formula (5), and the steel material has a ferrite area fraction of 40% or less and a martensite area fraction of 10% or less. As a result, a low-cycle bending fatigue strength of an induction-hardened component produced by subjecting the steel material to induction hardening is sufficiently increased, and a sufficient machinability is obtained for the steel material, while a roller-pitting fatigue strength and a high-cycle bending fatigue strength of the induction-hardened component are sufficiently increased.

[Induction-Hardened Component]

For producing the induction-hardened component according to the present embodiment, the steel material according to the present embodiment is used as a starting material. Specifically, the induction-hardened component according to the present embodiment is produced by subjecting the steel material according to the present embodiment to induction hardening. An induction-hardened component is used in, for example, a power transmitting part, typically a differential gear.

The induction-hardened component includes not only a component subjected entirely to induction hardening treatment, but also a component subjected partly to induction hardening treatment. In other words, an induction-hardened component may herein include a hardened portion, which is a portion subjected to induction hardening, and a non-hardened portion, which is a portion not subjected to the induction hardening. Note that when a component is entirely subjected to induction hardening treatment, the entire component is equivalent to a hardened portion.

The induction-hardened component according to the present embodiment includes a hardened layer and a core portion. The hardened layer is formed in an outer layer (in a hardened portion) of the induction-hardened component. The hardened layer is formed by performing induction hardening. The core portion is a portion of the induction-hardened component that is inner than the hardened layer and is a portion that is not influenced by induction hardening.

[Hardened Layer]

A microstructure of a hardened layer has a martensite area fraction of 90% or more. The balance of the microstructure is ferrite. Note that martensite herein includes tempered martensite and further includes bainite. In martensite, almost no carbides are present in laths. In contrast, in tempered martensite and bainite, a large number of precipitates are present in laths and lath boundaries. However, these are herein not distinguished from one another and are all considered as "martensite". The balance of the microstructure of the hardened layer is ferrite.

A microstructure of a hardened layer can be determined by the following method. In an induction-hardened component, a sample is extracted from an effective case that is defined in JIS G 0559(2008). A surface of the sample (referred to as an observation surface) is subjected to mirror polishing and then immersed in the Nital etchant to be etched, by which a structure appears. The etched observation surface is observed under an optical microscope with 400× magnification, and photographic images are created. In the observation surface, given three visual fields are observed. The visual fields are each made to have an area of 130 μm×260 μm. In each visual field, phases of martensite, ferrite, pearlite, and the like can be distinguished from one another by their contrasts. Specifically, when the observation surface is etched with the Nital etchant, phases each having a lamella structure can be identified as pearlite. Regions each having a brightness higher than that of pearlite (white regions) can be identified as ferrite. Regions each having a brightness lower than that of ferrite and pearlite (dark regions) can be identified as martensite. In each visual field, an area of martensite is determined. Based on a total area of martensite in the three visual fields and a total area of the visual fields, the martensite area fraction (%) is defined.

Note that a chemical composition of the hardened layer is the same as that of the steel material according to the present embodiment. In the chemical composition of the hardened layer, contents of elements fall within the ranges according to the present embodiment and satisfy Formula (1) to Formula (4).

[Core Portion]

The core portion is a portion of the induction-hardened component that is inner than the hardened layer and is a portion that is not influenced by induction hardening. A chemical composition and a microstructure of the core portion is the same as the chemical composition and the microstructure of the steel material according to the present embodiment. In other words, the core portion includes a chemical composition in which contents of elements fall within the ranges according to the present embodiment and satisfy Formula (1) to Formula (5), and the core portion includes a microstructure having a ferrite area fraction of 40% or less, with the balance of the microstructure being pearlite and/or martensite. An area fraction of the martensite is 10% or less.

For the core portion, the chemical composition, the ferrite area fraction of the microstructure, and $Mn_\theta$ and $C_\theta$, a concentration of Mn and a concentration of Cr in cementite, are determined by the following method. A portion inner than an effective case defined in JIS G 0559(2008) is defined as a core portion. A sample is extracted from a core portion of an induction-hardened component. The extracted sample is subjected to a well-known component analysis process. Specifically, machined chips are produced from the sample with a drill, and the machined chips are extracted. The extracted machined chips are caused to be dissolved in acid, by which their solution is obtained. The solution is subjected to inductively coupled plasma atomic emission spectrometry (ICP-AES), by which an elementary analysis of the chemical composition is performed. A content of C and a content of S are determined by a well-known high-frequency combustion (infrared absorptiometry after combustion). A content of N is determined by a well-known inert gas fusion thermal conductivity method. Moreover, the sample is used to determine a ferrite area fraction of the microstructure and $Mn_\theta$ and $Cr_\theta$, a concentration of Mn and a concentration of Cr in cementite, by the same method as that for the steel material according to the present embodiment.

Note that, as described above, the induction-hardened component according to the present embodiment may be subjected entirely to induction hardening, or the induction-hardened component may include a part subjected to induction hardening and the remaining part not subjected to induction hardening. In short, it will suffice for the induction-hardened component to include a part subjected to induction hardening. In an induction-hardened component, a portion subjected to induction hardening will be referred to as "hardened portion", and a portion not subjected to the induction hardening will be referred to as a "non-hardened portion". As will be described below, a steel material to be a starting material of an induction-hardened component is produced by being subjected to normalizing treatment. A steel material produced by being subjected to normalizing treatment is then subjected to machining (e.g., cutting) at its surface. Therefore, the surface of the steel material subjected to machining has a metallic luster. Induction hardening is performed on a part of a steel material subjected to machining to produce an induction-hardened component. Thus, a surface of a hardened portion of the induction-hardened component is discolored (color-tinted) by heating in induction hardening. In contrast, a surface of a non-hardened portion of the induction-hardened component maintains a metallic luster. Therefore, it is easy for those skilled in the art to distinguish between a hardened portion and a non-hardened portion by observing an appearance of an induction-hardened component. Note that a hardened portion includes a hardened layer described above and a core portion.

The induction-hardened component according to the present embodiment is produced by subjecting the steel material according to the present embodiment to induction hardening. The induction-hardened component is therefore excellent in roller-pitting fatigue strength and high-cycle bending fatigue strength. In addition, the induction-hardened component is also excellent in low-cycle bending fatigue strength.

[Production Method]

An example of a method for producing the steel material according to the present embodiment will be described below. Note that the production method is not limited to the following producing method as long as the steel material according to the present embodiment has the above-described configuration. The production method described below is nonetheless a preferable example of producing the steel material according to the present embodiment.

The method for producing the steel material according to the present embodiment includes a starting-material preparation process, a hot-working process, and a normalizing-treatment process. The processes will be described below in detail.

[Starting-Material Preparation Process]

In the starting-material preparation process, a starting material having a chemical composition in which contents of elements fall within the ranges according to the present embodiment and satisfy Formula (1) to Formula (4). Specifically, a molten steel having a chemical composition in which contents of elements fall within the ranges according to the present embodiment and satisfy Formula (1) to Formula (4) is produced. The produced molten steel is used to produce a cast piece (slab or bloom) or an ingot by a well-known casting method. Through the above process, the starting material (cast piece or ingot) is produced.

[Hot-Working Process]

In the hot-working process, the starting material (cast piece or ingot) is subjected to hot working to be produced into an intermediate steel material. Examples of the intermediate steel material include a steel bar and a wire rod.

The hot working includes a rough-rolling process and a finish-rolling process. In the rough-rolling process, the starting material is subjected to hot working to be produced into a billet. In the rough-rolling process, for example, a blooming mill is used. A blooming mill is used to perform blooming on the starting material, producing the billet. In a case where a continuous mill is installed downstream of the blooming mill, the billet produced by the blooming may be further subjected to hot rolling using the continuous mill to be produced into a billet having a smaller size. In a continuous mill, horizontal stands each of which includes a pair of horizontal rolls and vertical stands each of which includes a pair of vertical rolls are arranged alternately in a row. Through the above process, in the rough-rolling process, the starting material is produced into a billet. In the rough-rolling process, its heating temperature is not limited to a specific temperature; however, an example of the heating temperature is 1100 to 1300° C.

In the finish-rolling process, the billet is heated with a reheating furnace or a soaking pit. The heated billet is subjected to hot rolling using a continuous mill to be produced into a steel material (steel bar). At the rolling finishing temperature, its heating temperature is not limited to a specific temperature; however, an example of the heating temperature is 1000 to 1300° C. In addition, its rolling finishing temperature is not limited to a specific temperature; however, an example of the rolling finishing temperature is 900 to 1100° C. After the finish rolling, the steel material (steel bar) is cooled to be produced into the intermediate steel material.

Note that the above description of hot-working process is made about a hot-rolling process as an example. However, for the steel material according to the present embodiment, a hot-forging process may be performed in place of the hot-rolling process, as the hot-working process. Moreover, the hot-working process may include the hot-rolling process and a hot-forging process performed after the hot-rolling process. A shape of the steel material according to the present embodiment may be that of a steel bar or a wire rod, or the steel material may have a predetermined shape formed by hot forging.

[Normalizing-Treatment Process]

In the normalizing-treatment process, the intermediate steel material produced through the hot-working process is subjected to normalizing treatment to be produced into a steel material satisfying Formula (5).

Specifically, the intermediate steel material is charged into a heat treatment furnace (normalizing furnace). The intermediate steel material is then held at a normalizing temperature of 800 to 950° C. for 30 minutes to 2 hours. The held intermediate steel material is drawn from the heat treatment furnace and cooled. At that time, an average cooling rate CR for a temperature range of 700 to 300° C., which is a cementite production temperature range, is set at 0.10 to 1.00° C./sec. If the average cooling rate CR is less than 0.10° C./sec, $Mn_\theta$ and $Cr_\theta$, a concentration of Mn and a concentration of Cr in cementite, are increased, which makes FN5 fail to satisfy Formula (5). If the average cooling rate CR is more than 1.00° C./sec, an area fraction of martensite increases in a microstructure of the steel material, which decreases machinability. When the average cooling rate CR for the temperature range of 700 to 300° C. is 0.10 to 1.00° C./sec, $Mn_\theta$ and $Cr_\theta$, a concentration of Mn and a concentration of Cr in cementite, are decreased, and as a result, FN5 satisfies Formula (5).

Through the above production processes, the steel material according to the present embodiment is produced. In other words, the steel material according to the present embodiment is produced by performing normalizing treatment of which an average cooling rate CR is 0.10 to 1.00° C./sec.

[Method for Producing Induction-Hardened Component]

An example of a method for producing the induction-hardened component according to the present embodiment is as follows.

A method for producing the induction-hardened component according to the present embodiment includes a forging process performed when necessary, a machining process, an induction-hardening process, and a tempering process.

[Machining Process]

In the machining process, the intermediate member is subjected to cutting or piercing machining to be shaped. By performing machining, a detailed shape can be given to the steel material.

[Induction Hardening Process]

In the induction hardening process, the steel material subjected to the machining process is subjected to induction hardening to be produced into an induction-hardened component.

As the induction hardening, a well-known induction-hardening method may be performed. In the induction hardening, for example, its induction-hardening temperature (highest heating temperature) is set at 850 to 1100° C. When the induction-hardening temperature is 850° C. or more, the steel material can be subjected to hardening sufficiently. In this case, a hardened layer is formed. A holding time at the induction-hardening temperature is not limited to a specific time; however, a preferable holding time is, for example, 0.5 to 60 seconds.

[Tempering Process]

The steel material subjected to the induction-hardening process is subjected to a well-known tempering process. A tempering temperature is, for example, 100 to 200° C. A holding time at the tempering temperature is, for example, 90 to 150 minutes.

Through the above processes, an induction-hardened component having the above-described configuration is produced.

EXAMPLE

The present invention will be described below specifically with reference to examples. Conditions described in EXAMPLE are an example of conditions that are adapted to confirm the feasibility and the advantageous effects of the steel material according to the present embodiment. Therefore, the steel material according to the present embodiment is not limited to this example of conditions.

[Experimental Method]

Molten steels having chemical compositions shown in Table 1 and Table 2 were used to produce ingots each weighing 150 kg.

TABLE 1

| Test No. | Chemical composition (in mass %, the balance being Fe and impurities) | | | | | | | | | | | | | | | |
|---|---|---|---|---|---|---|---|---|---|---|---|---|---|---|---|---|
| | C | Si | Mn | Cr | S | N | Ti | B | Al | P | Mo | Ni | Cu | Ca | Mg | Te |
| 1 | 0.72 | 0.42 | 0.45 | 0.13 | 0.017 | 0.0042 | 0.0220 | 0.0022 | 0.028 | 0.020 | | | | | | |
| 2 | 0.70 | 0.41 | 0.49 | 0.13 | 0.015 | 0.0043 | 0.0310 | 0.0018 | 0.028 | 0.012 | | | | | | |
| 3 | 0.41 | 1.85 | 0.88 | 0.32 | 0.022 | 0.0045 | 0.0240 | 0.0015 | 0.020 | 0.024 | | | | | | |
| 4 | 0.39 | 1.95 | 0.77 | 0.34 | 0.023 | 0.0040 | 0.0200 | 0.0022 | 0.034 | 0.020 | | | | | | |
| 5 | 0.40 | 2.13 | 0.95 | 0.04 | 0.024 | 0.0043 | 0.0190 | 0.0019 | 0.031 | 0.015 | | | | | | |
| 6 | 0.43 | 1.95 | 0.85 | 0.06 | 0.024 | 0.0041 | 0.0310 | 0.0018 | 0.031 | 0.028 | | | | | | |
| 7 | 0.70 | 0.15 | 0.38 | 0.26 | 0.024 | 0.0040 | 0.0220 | 0.0018 | 0.025 | 0.013 | | | | | | |
| 8 | 0.62 | 0.78 | 0.31 | 0.41 | 0.023 | 0.0042 | 0.0210 | 0.0016 | 0.026 | 0.017 | | | | | | |
| 9 | 0.68 | 0.76 | 0.26 | 0.44 | 0.025 | 0.0038 | 0.0320 | 0.0022 | 0.035 | 0.022 | | | | | | |
| 10 | 0.56 | 1.22 | 0.70 | 0.02 | 0.015 | 0.0039 | 0.0180 | 0.0018 | 0.022 | 0.018 | | | | | | |
| 11 | 0.60 | 1.14 | 0.30 | | 0.041 | 0.0042 | 0.0230 | 0.0019 | 0.033 | 0.023 | | | | | | |
| 12 | 0.55 | 1.11 | 0.64 | 0.31 | 0.074 | 0.0042 | 0.0210 | 0.0021 | 0.022 | 0.025 | | | | | | |
| 13 | 0.53 | 1.29 | 0.44 | 0.24 | 0.069 | 0.0041 | 0.0280 | 0.0019 | 0.029 | 0.014 | | | | | | |
| 14 | 0.54 | 1.27 | 0.40 | 0.18 | 0.006 | 0.0040 | 0.0260 | 0.0021 | 0.022 | 0.019 | | | | | | |
| 15 | 0.58 | 1.16 | 0.36 | 0.27 | 0.004 | 0.0041 | 0.0230 | 0.0017 | 0.025 | 0.020 | | | | | | |
| 16 | 0.46 | 1.85 | 0.56 | 0.29 | 0.023 | 0.0042 | 0.0310 | 0.0004 | 0.023 | 0.024 | | | | | | |
| 17 | 0.52 | 1.34 | 0.55 | 0.26 | 0.024 | 0.0044 | 0.0330 | 0.0025 | 0.024 | 0.019 | | | | | | |
| 18 | 0.55 | 1.29 | 0.57 | 0.18 | 0.027 | 0.0042 | 0.0290 | 0.0005 | 0.021 | 0.017 | | | | | | |
| 19 | 0.61 | 0.92 | 0.51 | 0.16 | 0.024 | 0.0046 | 0.0280 | 0.0052 | 0.019 | 0.017 | | | | | | |
| 20 | 0.55 | 1.27 | 0.41 | 0.25 | 0.014 | 0.0210 | 0.0470 | 0.0018 | 0.030 | 0.019 | | | | | | |
| 21 | 0.55 | 1.23 | 0.44 | 0.30 | 0.024 | 0.0191 | 0.0510 | 0.0019 | 0.028 | 0.018 | | | | | | |
| 22 | 0.62 | 0.77 | 0.37 | 0.25 | 0.022 | 0.0022 | 0.0230 | 0.0017 | 0.022 | 0.017 | | | | | | |
| 23 | 0.61 | 0.87 | 0.33 | 0.28 | 0.015 | 0.0015 | 0.0220 | 0.0018 | 0.019 | 0.017 | | | | | | |
| 24 | 0.60 | 0.84 | 0.42 | 0.22 | 0.019 | 0.0043 | 0.2100 | 0.0022 | 0.023 | 0.015 | | | | | | |
| 25 | 0.61 | 0.85 | 0.43 | 0.21 | 0.022 | 0.0043 | 0.1800 | 0.0024 | 0.025 | 0.018 | | | | | | |
| 26 | 0.61 | 0.82 | 0.43 | 0.19 | 0.025 | 0.0023 | 0.0098 | 0.0024 | 0.031 | 0.019 | | | | | | |
| 27 | 0.55 | 1.29 | 0.43 | 0.27 | 0.018 | 0.0045 | 0.0030 | 0.0018 | 0.022 | 0.021 | | | | | | |
| 28 | 0.67 | 0.54 | 0.41 | 0.31 | 0.013 | 0.0053 | 0.0230 | 0.0018 | 0.121 | 0.022 | | | | | | |
| 29 | 0.59 | 1.03 | 0.46 | 0.28 | 0.018 | 0.0042 | 0.0290 | 0.0015 | 0.094 | 0.017 | | | | | | |
| 30 | 0.60 | 0.93 | 0.39 | 0.32 | 0.023 | 0.0039 | 0.0310 | 0.0019 | 0.006 | 0.021 | | | | | | |
| 31 | 0.57 | 1.12 | 0.71 | 0.24 | 0.027 | 0.0041 | 0.0320 | 0.0019 | 0.003 | 0.016 | | | | | | |
| 32 | 0.61 | 0.73 | 0.40 | 0.19 | 0.029 | 0.0042 | 0.0310 | 0.0022 | 0.023 | 0.053 | | | | | | |

| Test No. | Chemical composition (in mass %, the balance being Fe and impurities) | | | | | | | | | |
|---|---|---|---|---|---|---|---|---|---|---|
| | REM | Zr | Nb | V | Sb | Pb | FN1 | FN2 | FN3 | FN4 |
| 1 | | | | | | | 659.8 | 0.884 | 6.07 | 0.005 |
| 2 | | | | | | | 653.5 | 0.871 | 6.49 | 0.014 |
| 3 | | | | | | | 641.4 | 0.886 | 29.92 | 0.006 |
| 4 | | | | | | | 640.6 | 0.860 | 29.14 | 0.004 |
| 5 | | | | | | | 652.5 | 0.899 | 22.28 | 0.002 |
| 6 | | | | | | | 652.2 | 0.885 | 19.74 | 0.015 |
| 7 | | | | | | | 640.5 | 0.826 | 5.85 | 0.006 |
| 8 | | | | | | | 648.8 | 0.839 | 9.63 | 0.004 |
| 9 | | | | | | | 665.2 | 0.889 | 8.52 | 0.017 |
| 10 | | | | | | | 653.4 | 0.877 | 11.09 | 0.002 |
| 11 | | | | | | | 661.0 | 0.823 | 5.95 | 0.006 |
| 12 | | | | | | | 645.0 | 0.871 | 16.14 | 0.004 |
| 13 | | | | | | | 648.2 | 0.829 | 12.60 | 0.012 |
| 14 | | | | | | | 650.1 | 0.821 | 10.72 | 0.010 |
| 15 | | | | | | | 656.2 | 0.848 | 10.65 | 0.007 |
| 16 | | | | | | | 655.9 | 0.869 | 20.12 | 0.014 |
| 17 | | | | | | | 647.8 | 0.850 | 15.30 | 0.015 |
| 18 | | | | | | | 654.0 | 0.868 | 13.31 | 0.012 |
| 19 | | | | | | | 652.9 | 0.861 | 9.80 | 0.010 |
| 20 | | | | | | | 653.0 | 0.841 | 11.95 | −0.037 |
| 21 | | | | | | | 651.0 | 0.847 | 13.13 | −0.025 |
| 22 | | | | | | | 648.3 | 0.832 | 8.60 | 0.014 |

TABLE 1-continued

|  |  | | | |
|---|---|---|---|---|
| 23 | 650.4 | 0.831 | 8.89 | 0.016 |
| 24 | 646.0 | 0.828 | 9.31 | 0.193 |
| 25 | 649.4 | 0.841 | 9.25 | 0.163 |
| 26 | 647.9 | 0.834 | 8.86 | 0.001 |
| 27 | 654.0 | 0.850 | 12.73 | −0.015 |
| 28 | 651.3 | 0.864 | 8.41 | 0.002 |
| 29 | 652.6 | 0.860 | 11.70 | 0.012 |
| 30 | 650.5 | 0.846 | 10.63 | 0.015 |
| 31 | 651.3 | 0.899 | 15.54 | 0.016 |
| 32 | 643.4 | 0.815 | 8.16 | 0.014 |

TABLE 2

| Test No. | Chemical composition (in mass %, the balance being Fe and impurities) | | | | | | | | | | | | | | | |
|---|---|---|---|---|---|---|---|---|---|---|---|---|---|---|---|---|
| | C | Si | Mn | Cr | S | N | Ti | B | Al | P | Mo | Ni | Cu | Ca | Mg | Te |
| 33 | 0.61 | 0.79 | 0.43 | 0.25 | 0.023 | 0.0041 | 0.0320 | 0.0018 | 0.031 | 0.049 | | | | | | |
| 34 | 0.56 | 1.18 | 0.53 | 0.17 | 0.022 | 0.0041 | 0.0240 | 0.0016 | 0.024 | 0.013 | | | | | | |
| 35 | 0.62 | 0.72 | 0.66 | 0.15 | 0.016 | 0.0039 | 0.0310 | 0.0017 | 0.019 | 0.020 | | | | | | |
| 36 | 0.62 | 0.61 | 0.56 | 0.16 | 0.019 | 0.0044 | 0.0240 | 0.0023 | 0.025 | 0.017 | | | | | | |
| 37 | 0.52 | 1.01 | 0.99 | 0.12 | 0.027 | 0.0056 | 0.0340 | 0.0022 | 0.022 | 0.011 | | | | | | |
| 38 | 0.54 | 0.84 | 0.81 | 0.22 | 0.032 | 0.0051 | 0.0250 | 0.0017 | 0.029 | 0.022 | | | | | | |
| 39 | 0.58 | 0.89 | 0.78 | 0.29 | 0.033 | 0.0045 | 0.0320 | 0.0022 | 0.026 | 0.025 | | | | | | |
| 40 | 0.61 | 0.86 | 0.73 | 0.19 | 0.035 | 0.0042 | 0.0230 | 0.0017 | 0.022 | 0.017 | | | | | | |
| 41 | 0.62 | 1.26 | 0.50 | 0.17 | 0.014 | 0.0045 | 0.0340 | 0.0014 | 0.028 | 0.013 | | | | | | |
| 42 | 0.68 | 0.45 | 0.47 | 0.11 | 0.033 | 0.0049 | 0.0290 | 0.0018 | 0.028 | 0.018 | | | | | | |
| 43 | 0.69 | 0.39 | 0.44 | 0.11 | 0.032 | 0.0042 | 0.0310 | 0.0024 | 0.028 | 0.015 | | | | | | |
| 44 | 0.67 | 0.60 | 0.31 | 0.11 | 0.022 | 0.0054 | 0.0320 | 0.0017 | 0.020 | 0.022 | | | | | | |
| 45 | 0.62 | 0.55 | 0.66 | 0.33 | 0.026 | 0.0041 | 0.0250 | 0.0018 | 0.023 | 0.016 | | | | | | |
| 46 | 0.63 | 0.38 | 0.75 | 0.46 | 0.026 | 0.0046 | 0.0340 | 0.0016 | 0.022 | 0.016 | | | | | | |
| 47 | 0.66 | 0.30 | 0.81 | 0.15 | 0.022 | 0.0044 | 0.0330 | 0.0018 | 0.023 | 0.016 | | | | | | |
| 48 | 0.58 | 0.84 | 0.53 | 0.19 | 0.024 | 0.0044 | 0.0210 | 0.0020 | 0.023 | 0.022 | 0.99 | | | | | |
| 49 | 0.64 | 0.63 | 0.54 | 0.20 | 0.022 | 0.0046 | 0.0340 | 0.0022 | 0.022 | 0.012 | 0.23 | | | | | |
| 50 | 0.65 | 0.60 | 0.55 | 0.21 | 0.019 | 0.0048 | 0.0310 | 0.0019 | 0.021 | 0.011 | | 0.98 | | | | |
| 51 | 0.66 | 0.57 | 0.56 | 0.19 | 0.017 | 0.0047 | 0.0290 | 0.0016 | 0.020 | 0.017 | | | 0.99 | | | |
| 52 | 0.65 | 0.59 | 0.51 | 0.18 | 0.022 | 0.0044 | 0.0250 | 0.0015 | 0.026 | 0.016 | | | | 0.0040 | | |
| 53 | 0.64 | 0.61 | 0.54 | 0.16 | 0.023 | 0.0048 | 0.0350 | 0.0019 | 0.022 | 0.015 | | | | | 0.0048 | |
| 54 | 0.66 | 0.62 | 0.52 | 0.32 | 0.020 | 0.0051 | 0.0260 | 0.0018 | 0.025 | 0.014 | | | | | | 0.18 |
| 55 | 0.65 | 0.63 | 0.52 | 0.24 | 0.017 | 0.0045 | 0.0360 | 0.0018 | 0.033 | 0.016 | | | | | | |
| 56 | 0.66 | 0.58 | 0.50 | 0.24 | 0.018 | 0.0039 | 0.0320 | 0.0015 | 0.023 | 0.019 | | | | | | |
| 57 | 0.65 | 0.52 | 0.52 | 0.19 | 0.018 | 0.0042 | 0.0440 | 0.0023 | 0.013 | 0.021 | | | | | | |
| 58 | 0.64 | 0.42 | 0.32 | 0.11 | 0.031 | 0.0045 | 0.0350 | 0.0024 | 0.032 | 0.011 | | | | | | |
| 59 | 0.86 | 0.54 | 0.59 | 0.23 | 0.017 | 0.0051 | 0.0280 | 0.0022 | 0.027 | 0.032 | | | | | | |
| 60 | 0.65 | 0.53 | 0.36 | 0.14 | 0.015 | 0.0060 | 0.0220 | 0.0018 | 0.029 | 0.023 | | | | | | |
| 61 | 0.59 | 0.60 | 1.10 | 0.01 | 0.042 | 0.0042 | 0.0230 | 0.0015 | 0.021 | 0.015 | | | | | | |
| 62 | 0.56 | 1.19 | 0.55 | 0.42 | 0.024 | 0.0048 | 0.0260 | 0.0022 | 0.025 | 0.014 | | | | | | |
| 63 | 0.65 | 0.30 | 0.82 | 0.15 | 0.023 | 0.0044 | 0.0320 | 0.0019 | 0.024 | 0.018 | | | | | | |
| 64 | 0.56 | 1.32 | 0.65 | 0.14 | 0.022 | 0.0048 | 0.0300 | 0.0021 | 0.027 | 0.015 | | | | | | |
| 65 | 0.59 | 1.45 | 0.37 | 0.13 | 0.023 | 0.0061 | 0.0420 | 0.0018 | 0.024 | 0.014 | | | | | | |
| 66 | 0.58 | 1.39 | 0.38 | 0.12 | 0.024 | 0.0055 | 0.0360 | 0.0015 | 0.025 | 0.013 | | | | | | |

| Test No. | Chemical composition (in mass %, the balance being Fe and impurities) | | | | | | | | | |
|---|---|---|---|---|---|---|---|---|---|---|
| | REM | Zr | Nb | V | Sb | Pb | FN1 | FN2 | FN3 | FN4 |
| 33 | | | | | | | 646.4 | 0.837 | 9.54 | 0.016 |
| 34 | | | | | | | 651.4 | 0.853 | 11.88 | 0.008 |
| 35 | | | | | | | 645.8 | 0.872 | 10.35 | 0.015 |
| 36 | | | | | | | 640.3 | 0.837 | 8.94 | 0.006 |
| 37 | | | | | | | 631.3 | 0.876 | 16.49 | 0.012 |
| 38 | | | | | | | 628.6 | 0.846 | 15.19 | 0.005 |
| 39 | | | | | | | 642.7 | 0.895 | 16.04 | 0.014 |
| 40 | | | | | | | 649.9 | 0.900 | 12.72 | 0.006 |
| 41 | | | | | | | 672.8 | 0.919 | 11.14 | 0.016 |
| 42 | | | | | | | 649.7 | 0.851 | 6.38 | 0.009 |
| 43 | | | | | | | 649.6 | 0.846 | 5.88 | 0.014 |
| 44 | | | | | | | 654.3 | 0.830 | 5.52 | 0.010 |
| 45 | | | | | | | 637.3 | 0.867 | 12.33 | 0.009 |
| 46 | | | | | | | 631.7 | 0.885 | 14.20 | 0.016 |
| 47 | | | | | | | 636.4 | 0.882 | 9.25 | 0.015 |
| 48 | | | | | | | 640.2 | 0.867 | 41.53 | 0.003 |
| 49 | | | | | | | 647.1 | 0.869 | 15.55 | 0.016 |
| 50 | | | | | | | 648.5 | 0.869 | 12.50 | 0.012 |
| 51 | | | | | | | 649.9 | 0.875 | 12.01 | 0.010 |
| 52 | | | | | | | 648.0 | 0.856 | 8.35 | 0.007 |
| 53 | | | | | | | 646.1 | 0.853 | 8.56 | 0.016 |

TABLE 2-continued

| | | | | | | | | |
|---|---|---|---|---|---|---|---|---|
| 54 | | | | | | 652.4 | 0.888 | 10.34 | 0.008 |
| 55 | | 0.0045 | | | | 650.0 | 0.871 | 9.43 | 0.018 |
| 56 | 0.0043 | | | | | 650.4 | 0.870 | 8.88 | 0.016 |
| 57 | | | 0.18 | | | 644.5 | 0.849 | 8.29 | 0.027 |
| 58 | | | | 0.12 | | 636.6 | 0.896 | 6.36 | 0.017 |
| 59 | | | | | 0.014 | | 648.4 | 0.881 | 9.55 | 0.008 |
| 60 | | | | | | 0.09 | 645.0 | 0.813 | 6.19 | −0.002 |
| 61 | | | | | | 631.1 | 0.897 | 11.32 | 0.006 |
| 62 | | | | | | 651.9 | 0.887 | 17.04 | 0.007 |
| 63 | | | | | | 633.5 | 0.874 | 9.43 | 0.014 |
| 64 | | | | | | 658.4 | 0.894 | 13.65 | 0.011 |
| 65 | | | | | | 673.6 | 0.886 | 9.64 | 0.018 |
| 66 | | | | | | 667.7 | 0.868 | 9.51 | 0.014 |

Blank fields seen in Table 1 and Table 2 each indicate that a content of a corresponding element falls below a detection limit of the element. In other words, the blank fields each indicate that a content of a corresponding element falls below a detection limit of the element at its least significant digit. For example, in a case of contents of Cu shown in Table 1, their least significant digit is the second decimal place. Therefore, a content of Mo of Test No. 1 indicates that Mo was not detected to the second decimal place (significant figures of its content was 0% to the second decimal place).

The produced ingots were subjected to hot rolling (the rough-rolling process and the finish-rolling process) to be produced into intermediate steel materials (steel bars). In the rough-rolling process, the heating temperatures were all within the range of 1100 to 1300° C. In the finish-rolling process, heating temperatures were all within the range of 1200 to 1250° C. In addition, rolling finishing temperatures were within the range of 900 to 1100° C. Furthermore, in Test Nos. 64 and 65, their intermediate steel materials subjected to hot rolling were further subjected to hot forging (hot cogging), and the intermediate steel materials subjected to the hot cogging were allowed to be cooled (shown as "Performed" in the column "Hot forging" in Table 3 and Table 4). Note that, in Test Nos. 1 to 63, their intermediate steel materials were allowed to be cooled without being subjected to the hot forging after the hot rolling. Through the above processes, the steel bars (intermediate steel materials) having diameters of 30 to 100 mm were produced.

The intermediate steel materials of Test Nos. 1 to 61, 64 and 65 were subjected to normalizing treatment. Specifically, the intermediate steel materials of these test numbers were charged into a heat treatment furnace (normalizing furnace) and held at 850° C. for 1 hour. The intermediate steel materials after being held were subjected to air cooling, oil cooling, or water cooling. Average cooling rates CR for 700 to 300° C. were as shown in Table 3 and Table 4 (shown in the column "Average cooling rate CR (° C./sec)" in Table 3 and Table 4). Note that, in Test Nos. 62 and 63, the normalizing treatment was not performed.

TABLE 3

| | | | | Steel material | | | | | |
|---|---|---|---|---|---|---|---|---|---|
| Test No. | Hot forging | Normalizing | Average cooling rate CR (° C./sec) | $Mn_\theta$ (mass %) | $Cr_\theta$ (mass %) | FN5 | Ferrite area fraction (%) | Martensite area fraction (%) | Machinability |
| 1 | Not performed | Performed | 0.50 | 0.45 | 0.13 | 8.6 | 2 | 1 | X |
| 2 | Not performed | Performed | 0.50 | 0.49 | 0.13 | 9.0 | 5 | 0 | C |
| 3 | Not performed | Performed | 0.50 | 0.88 | 0.32 | 18.9 | 30 | 0 | B |
| 4 | Not performed | Performed | 0.50 | 0.77 | 0.34 | 18.5 | 38 | 2 | A |
| 5 | Not performed | Performed | 0.50 | 0.95 | 0.04 | 10.5 | 38 | 4 | B |
| 6 | Not performed | Performed | 0.45 | 0.86 | 0.06 | 10.5 | 39 | 3 | B |
| 7 | Not performed | Performed | 0.45 | 0.39 | 0.28 | 12.8 | 5 | 0 | A |
| 8 | Not performed | Performed | 0.43 | 0.32 | 0.45 | 17.6 | 15 | 1 | A |
| 9 | Not performed | Performed | 0.50 | 0.26 | 0.44 | 16.8 | 4 | 0 | — |
| 10 | Not performed | Performed | 0.50 | 0.70 | 0.02 | 7.4 | 25 | 0 | C |
| 11 | Not performed | Performed | 0.36 | 0.31 | 0.00 | 3.0 | 34 | 0 | — |
| 12 | Not performed | Performed | 0.44 | 0.65 | 0.33 | 17.1 | 18 | 0 | A |
| 13 | Not performed | Performed | 0.49 | 0.44 | 0.24 | 12.2 | 32 | 0 | A |
| 14 | Not performed | Performed | 0.50 | 0.40 | 0.18 | 9.7 | 34 | 2 | B |
| 15 | Not performed | Performed | 0.49 | 0.36 | 0.27 | 12.4 | 25 | 0 | X |
| 16 | Not performed | Performed | 0.49 | 0.56 | 0.30 | 15.0 | 36 | 2 | A |
| 17 | Not performed | Performed | 0.49 | 0.55 | 0.26 | 13.9 | 28 | 1 | A |
| 18 | Not performed | Performed | 0.49 | 0.57 | 0.18 | 11.5 | 25 | 1 | A |
| 19 | Not performed | Performed | 0.49 | 0.51 | 0.16 | 10.2 | 18 | 0 | A |
| 20 | Not performed | Performed | 0.48 | 0.41 | 0.26 | 12.3 | 29 | 0 | — |
| 21 | Not performed | Performed | 0.46 | 0.45 | 0.31 | 14.5 | 26 | 1 | A |
| 22 | Not performed | Performed | 0.42 | 0.38 | 0.28 | 12.7 | 19 | 0 | A |
| 23 | Not performed | Performed | 0.46 | 0.33 | 0.30 | 12.8 | 21 | 0 | B |
| 24 | Not performed | Performed | 0.46 | 0.43 | 0.23 | 11.7 | 22 | 1 | — |
| 25 | Not performed | Performed | 0.46 | 0.44 | 0.22 | 11.4 | 20 | 0 | A |
| 26 | Not performed | Performed | 0.46 | 0.44 | 0.20 | 10.7 | 20 | 2 | A |
| 27 | Not performed | Performed | 0.46 | 0.44 | 0.29 | 13.5 | 27 | 0 | B |
| 28 | Not performed | Performed | 0.46 | 0.41 | 0.33 | 14.6 | 2 | 0 | B |
| 29 | Not performed | Performed | 0.45 | 0.47 | 0.30 | 14.2 | 16 | 3 | B |

TABLE 3-continued

| | | | | | | | | | |
|---|---|---|---|---|---|---|---|---|---|
| 30 | Not performed | Performed | 0.48 | 0.39 | 0.33 | 14.4 | 19 | 0 | A |
| 31 | Not performed | Performed | 0.48 | 0.72 | 0.25 | 14.9 | 15 | 1 | B |
| 32 | Not performed | Performed | 0.39 | 0.41 | 0.22 | 11.1 | 22 | 0 | A |

| | Induction-hardened component | | | | | | | |
|---|---|---|---|---|---|---|---|---|
| | Hardened layer | Core portion | | | | | | |
| Test No. | Martensite area fraction (%) | $Mn_\theta$ (mass %) | $Cr_\theta$ (mass %) | FN5 | Ferrite area fraction (%) | Martensite area fraction (%) | Roller-pitting fatigue strength | High-cycle bending fatigue strength | Low-cycle bending fatigue strength |
|---|---|---|---|---|---|---|---|---|---|
| 1 | — | 0.45 | 0.13 | 8.6 | 2 | 1 | — | — | — |
| 2 | 100 | 0.49 | 0.13 | 9.0 | 5 | 0 | A | A | A |
| 3 | 100 | 0.88 | 0.32 | 18.9 | 30 | 0 | C | C | C |
| 4 | 100 | 0.77 | 0.34 | 18.5 | 38 | 2 | X | X | X |
| 5 | 92 | 0.95 | 0.04 | 10.5 | 38 | 4 | X | X | X |
| 6 | 100 | 0.86 | 0.06 | 10.5 | 39 | 3 | C | C | C |
| 7 | 100 | 0.39 | 0.28 | 12.8 | 5 | 0 | C | A | A |
| 8 | 100 | 0.32 | 0.45 | 17.6 | 15 | 1 | B | B | B |
| 9 | 100 | 0.26 | 0.44 | 16.8 | 4 | 0 | — | — | — |
| 10 | 100 | 0.70 | 0.02 | 7.4 | 25 | 0 | A | B | B |
| 11 | — | 0.31 | 0.00 | 3.0 | 34 | 0 | — | — | — |
| 12 | 100 | 0.65 | 0.33 | 17.1 | 18 | 0 | B | X | X |
| 13 | 100 | 0.44 | 0.24 | 12.4 | 32 | 0 | B | C | C |
| 14 | 100 | 0.40 | 0.18 | 9.7 | 34 | 2 | A | B | B |
| 15 | 100 | 0.36 | 0.27 | 12.4 | 25 | 0 | A | B | B |
| 16 | 100 | 0.56 | 0.30 | 15.0 | 36 | 2 | A | C | X |
| 17 | 100 | 0.55 | 0.26 | 13.9 | 28 | 1 | B | B | B |
| 18 | 100 | 0.57 | 0.18 | 11.5 | 25 | 1 | A | B | B |
| 19 | — | 0.51 | 0.16 | 10.2 | 18 | 0 | — | — | — |
| 20 | — | 0.41 | 0.26 | 12.3 | 29 | 0 | — | — | — |
| 21 | 100 | 0.45 | 0.31 | 14.5 | 26 | 1 | A | B | X |
| 22 | 100 | 0.38 | 0.28 | 12.7 | 19 | 0 | B | B | B |
| 23 | 100 | 0.33 | 0.30 | 12.8 | 21 | 0 | A | X | X |
| 24 | — | 0.43 | 0.23 | 11.7 | 22 | 1 | — | — | — |
| 25 | 100 | 0.44 | 0.22 | 11.4 | 20 | 0 | B | B | B |
| 26 | 100 | 0.44 | 0.20 | 10.7 | 20 | 2 | B | B | B |
| 27 | 100 | 0.44 | 0.29 | 13.5 | 27 | 0 | A | B | X |
| 28 | 90 | 0.41 | 0.33 | 14.6 | 2 | 0 | X | X | X |
| 29 | 100 | 0.47 | 0.30 | 14.2 | 16 | 3 | A | B | B |
| 30 | 100 | 0.39 | 0.33 | 14.4 | 19 | 0 | A | B | B |
| 31 | 100 | 0.72 | 0.25 | 14.9 | 15 | 1 | B | X | X |
| 32 | 100 | 0.41 | 0.22 | 11.1 | 22 | 0 | B | X | X |

TABLE 4

| | | | Steel material | | | | | | |
|---|---|---|---|---|---|---|---|---|---|
| Test No. | Hot forging | Normalizing | Average cooling rate CR (° C./sec) | $Mn_\theta$ (mass %) | $Cr_\theta$ (mass %) | FN5 | Ferrite area fraction (%) | Martensite area fraction (%) | Machinability |
| 33 | Not performed | Performed | 0.45 | 0.44 | 0.27 | 12.9 | 18 | 0 | A |
| 34 | Not performed | Performed | 0.50 | 0.53 | 0.17 | 10.7 | 26 | 0 | A |
| 35 | Not performed | Performed | 0.50 | 0.66 | 0.15 | 11.3 | 12 | 0 | C |
| 36 | Not performed | Performed | 1.00 | 0.51 | 0.11 | 8.5 | 15 | 5 | B |
| 37 | Not performed | Performed | 0.43 | 1.01 | 0.13 | 14.1 | 17 | 3 | B |
| 38 | Not performed | Performed | 0.44 | 0.82 | 0.24 | 18.0 | 17 | 3 | A |
| 39 | Not performed | Performed | 0.50 | 0.78 | 0.29 | 17.0 | 8 | 2 | B |
| 40 | Not performed | Performed | 0.50 | 0.73 | 0.19 | 13.2 | 8 | 1 | C |
| 41 | Not performed | Performed | 0.40 | 0.32 | 0.20 | 11.3 | 15 | 35 | X |
| 42 | Not performed | Performed | 0.50 | 0.47 | 0.11 | 8.1 | 10 | 2 | A |
| 43 | Not performed | Performed | 0.50 | 0.44 | 0.11 | 7.8 | 9 | 0 | A |
| 44 | Not performed | Performed | 0.41 | 0.32 | 0.12 | 7.1 | 19 | 1 | A |
| 45 | Not performed | Performed | 0.35 | 0.69 | 0.41 | 19.9 | 5 | 3 | A |
| 46 | Not performed | Performed | 0.36 | 0.79 | 0.56 | 25.9 | 0 | 1 | B |
| 47 | Not performed | Performed | 0.09 | 1.03 | 0.50 | 26.2 | 0 | 0 | B |
| 48 | Not performed | Performed | 0.44 | 0.54 | 0.20 | 11.9 | 11 | 1 | A |
| 49 | Not performed | Performed | 0.49 | 0.54 | 0.20 | 11.9 | 11 | 1 | A |
| 50 | Not performed | Performed | 0.47 | 0.56 | 0.22 | 12.5 | 8 | 1 | B |
| 51 | Not performed | Performed | 0.15 | 0.66 | 0.39 | 19.2 | 7 | 5 | B |
| 52 | Not performed | Performed | 0.10 | 0.64 | 0.48 | 21.9 | 11 | 2 | A |
| 53 | Not performed | Performed | 0.49 | 0.54 | 0.16 | 10.5 | 12 | 2 | A |

TABLE 4-continued

| | | | | | | | | | |
|---|---|---|---|---|---|---|---|---|---|
| 54 | Not performed | Performed | 0.48 | 0.52 | 0.33 | 15.7 | 3 | 2 | B |
| 55 | Not performed | Performed | 0.12 | 0.64 | 0.57 | 24.8 | 8 | 1 | C |
| 56 | Not performed | Performed | 0.15 | 0.59 | 0.50 | 21.9 | 7 | 2 | B |
| 57 | Not performed | Performed | 0.50 | 0.52 | 0.19 | 11.2 | 11 | 0 | B |
| 58 | Not performed | Performed | 0.45 | 0.33 | 0.12 | 7.0 | 24 | 4 | B |
| 59 | Not performed | Performed | 0.50 | 0.59 | 0.23 | 13.2 | 4 | 1 | C |
| 60 | Not performed | Performed | 0.24 | 0.44 | 0.34 | 15.1 | 19 | 0 | A |
| 61 | Not performed | Performed | 0.50 | 1.10 | 0.01 | 11.0 | 5 | 0 | B |
| 62 | Not performed | Not performed | — | 0.69 | 1.13 | 43.3 | 15 | 0 | B |
| 63 | Not performed | Not performed | — | 1.17 | 0.73 | 35.1 | 1 | 0 | B |
| 64 | Performed | Performed | 0.49 | 0.65 | 0.1 | 10.9 | 18 | 5 | B |
| 65 | Performed | Performed | 0.44 | 0.38 | 0.1 | 8.2 | 20 | 2 | B |
| 66 | Not performed | Performed | 1.20 | 0.38 | 0.12 | 7.6 | 18 | 79 | X |

| | Induction-hardened component | | | | | | | | |
|---|---|---|---|---|---|---|---|---|---|
| | Hardened layer | | | Core portion | | | | | |
| Test No. | Martensite area fraction (%) | $Mn_\theta$ (mass %) | $Cr_\theta$ (mass %) | FN5 | Ferrite area fraction (%) | Martensite area fraction (%) | Roller-pitting fatigue strength | High-cycle bending fatigue strength | Low-cycle bending fatigue strength |
| 33 | 100 | 0.44 | 0.27 | 12.9 | 18 | 0 | B | C | C |
| 34 | 100 | 0.53 | 0.17 | 10.7 | 26 | 0 | A | B | B |
| 35 | 100 | 0.66 | 0.15 | 11.3 | 12 | 0 | B | B | B |
| 36 | 100 | 0.51 | 0.11 | 8.5 | 15 | 5 | C | B | B |
| 37 | 100 | 1.01 | 0.13 | 14.1 | 17 | 3 | D | B | B |
| 38 | 100 | 0.82 | 0.24 | 18.0 | 17 | 3 | X | B | B |
| 39 | 100 | 0.78 | 0.29 | 17.0 | 8 | 2 | B | B | B |
| 40 | 100 | 0.73 | 0.19 | 13.2 | 8 | 1 | B | B | B |
| 41 | 100 | 0.52 | 0.20 | 11.3 | 15 | 35 | B | B | B |
| 42 | 100 | 0.47 | 0.11 | 8.1 | 10 | 2 | B | A | A |
| 43 | 95 | 0.44 | 0.11 | 7.8 | 9 | 0 | B | A | A |
| 44 | 50 | 0.32 | 0.12 | 7.1 | 19 | 4 | X | X | X |
| 45 | 100 | 0.69 | 0.41 | 19.9 | 5 | 3 | D | B | B |
| 46 | 100 | 0.79 | 0.56 | 25.9 | 0 | 1 | B | B | B |
| 47 | 80 | 1.03 | 0.50 | 26.2 | 0 | 0 | X | X | X |
| 48 | 100 | 0.54 | 0.20 | 11.9 | 11 | 1 | B | B | B |
| 49 | 100 | 0.54 | 0.20 | 11.9 | 11 | 1 | B | B | B |
| 50 | 100 | 0.56 | 0.22 | 12.5 | 8 | 1 | B | B | B |
| 51 | 100 | 0.66 | 0.39 | 19.2 | 7 | 5 | B | B | B |
| 52 | 100 | 0.64 | 0.48 | 21.9 | 11 | 2 | B | B | B |
| 53 | 100 | 0.54 | 0.16 | 10.5 | 12 | 2 | B | B | B |
| 54 | 100 | 0.52 | 0.33 | 15.7 | 3 | 2 | A | B | B |
| 55 | 100 | 0.64 | 0.57 | 24.8 | 8 | 1 | A | B | B |
| 56 | 100 | 0.59 | 0.50 | 21.9 | 7 | 2 | A | B | B |
| 57 | 100 | 0.52 | 0.19 | 11.2 | 11 | 0 | B | B | B |
| 58 | 100 | 0.33 | 0.12 | 7.0 | 24 | 4 | D | B | B |
| 59 | 100 | 0.59 | 0.23 | 13.2 | 4 | 1 | B | B | B |
| 60 | 100 | 0.40 | 0.33 | 14.6 | 11 | 0 | B | A | B |
| 61 | 100 | 1.10 | 0.01 | 11.0 | 5 | 0 | D | B | B |
| 62 | 85 | 0.69 | 1.13 | 43.3 | 24 | 0 | X | X | X |
| 63 | 80 | 1.17 | 0.73 | 35.1 | 0 | 0 | X | X | X |
| 64 | 100 | 0.65 | 0.1 | 10.9 | 18 | 5 | A | B | B |
| 65 | 100 | 0.38 | 0.1 | 8.2 | 20 | 2 | A | B | B |
| 66 | 100 | 0.38 | 0.12 | 7.6 | 18 | 79 | A | B | B |

Through the above production processes, steel materials (steel bars) of the test numbers were produced.

[Evaluation Tests]

[Evaluation Test on Steel Material]

[Test for Measuring $Mn_\theta$ and $Cr_\theta$, Concentrations of Mn and Cr in Cementite]

$Mn_\theta$ and $Cr_\theta$, a concentration of Mn and a concentration of Cr in cementite in the steel material of each test number, were determined by the following method. A test specimen was extracted from any location of the steel material of each test number. The test specimen was subjected to constant current electrolysis using 10%-AA-based electrolyte. After the constant-current electrolysis, suction filtration was performed with a filter having a mesh size of 0.2 μm to extract residues. The extracted residues were subjected to an acid decomposition process. After the acid decomposition process, the inductively coupled plasma atomic emission spectroscopy (ICP-AES) was performed to measure masses of Fe, Cr, and Mn in the residues. At that time, the residues were assumed to be entirely $M_3C$ carbide, that is, cementite. Based on the obtained mass of Fe, mass of Cr, and mass of Mn in the residues, with cementite being assumed to be 100 mass %, $Mn_\theta$ (mass %) and $Cr_\theta$ (mass %), a concentration of Mn and a concentration of Cr dissolved in the cementite, were calculated. The obtained concentrations of Mn, $Mn_\theta$, are shown in the column "$Mn_\theta$ (mass %)" in the column "Steel material" in Table 3 and Table 4. The obtained concentrations of Cr, $Cr_\theta$, were shown in the column "$Cr_\theta$ (mass %)" in the column "Steel material" in Table 3 and Table 4.

[Test for Measuring Ferrite Area Fraction and Martensite Area Fraction of Steel Material]

A ferrite area fraction (%) of the steel material of each test number was determined by the following method. A test specimen for microstructure observation was extracted from any location of the steel material. Out of surfaces of the test specimen, a cross section of the steel material that was perpendicular to a longitudinal direction (axial direction) of the steel material (observation surface) was polished. The polished observation surface was etched with Nital etchant. The etched observation surface was observed under an optical microscope with 400× magnification, and photographic images were created. In the photographic images, ferrite and martensite were identified by the above-described method. An area fraction of the identified ferrite was measured by the point counting method conforming to JIS G 0555(2003). The measured area fraction was defined as the ferrite area fraction of the steel material. The obtained ferrite area fractions are shown in the column "Ferrite area fraction (%)" in the column "Steel material" in Table 3 and Table 4. An area fraction of the identified martensite was measured by the point counting method conforming to JIS G 0555 (2003). The measured area fraction was defined as the martensite area fraction of the steel material. The obtained martensite area fractions are shown in the column "Martensite area fraction (%)" in the column "Steel material" in Table 3 and Table 4.

[Test for Evaluating Machinability]

The steel material of each test number was used to evaluate its machinability. First, for evaluating drilling machinability, a test specimen was fabricated from a center of each steel bar having a diameter of 30 to 100 mm. The test specimen had a columnar shape and a length of 21 mm A longitudinal direction of the test specimen was parallel to a longitudinal direction of the steel bar.

A drilling test was performed using a drill manufactured by NACHI-FUJIKOSHI CORP. having a model number of SD3.0. A feed per revolution was set at 0.25 mm, and a drilling depth of a hole was set at 9 mm. As a lubricant, water-soluble cutting oil was used. As an evaluation index, a maximum cutting speed VL1000, at which cutting can be performed up to a total depth of hole of 1000 mm, was determined.

Based on the determined maximum cutting speed VL1000, the evaluation was conducted as follows.

Evaluation A: the maximum cutting speed VL1000 was 50 m/min or more

Evaluation B: the maximum cutting speed VL1000 was 45 m/min or more to less than 50 m/min Evaluation C: the maximum cutting speed VL1000 was 40 in/min or more to less than 45 m/min Evaluation X: the maximum cutting speed VL1000 was less than 40 m/min When the evaluation fell under one of Evaluations A to C, the steel material was determined to be excellent in machinability. When the evaluation fell under Evaluation X, the steel material was determined to be low in machinability. Results of the evaluation are shown in the column "Machinability" in the column "Steel material" in Table 3 and Table 4.

[Evaluation Tests on Induction-Hardened Component]
[Roller-Pitting Fatigue Test (Test for Evaluating Roller-Pitting Fatigue Strength)]

A roller-pitting fatigue strength of an induction-hardened component was evaluated by the following method. The steel material of each test number was subjected to machining (cutting) to be fabricated into a small roller specimen 200 illustrated in FIG. 1 (hereinafter, simply referred to as a test specimen 200). In a case where a diameter of the steel material was less than 80 mm, the test specimen 200 was extracted such that a center position of a cross section of the test specimen 200 perpendicular to a longitudinal direction of the test specimen 200 matched a center position of a cross section of the steel material perpendicular to the longitudinal direction of the steel material. The longitudinal direction of the test specimen 200 was parallel to the longitudinal direction of the steel material. In a case where a diameter of the steel material was 80 mm or more, the test specimen 200 was extracted such that a center position of a cross section of the test specimen 200 perpendicular to the longitudinal direction of the test specimen 200 matched a center position of a radius R (i.e., 2/R position) of a cross section of the steel material perpendicular to the longitudinal direction of the steel material. The longitudinal direction of the test specimen 200 was parallel to the longitudinal direction of the steel material.

Numeric values in FIG. 1 indicate dimensions. In FIG. 1, "ϕ" indicates a diameter. In other words, "ϕ22" indicates a diameter of 22 mm. The test specimen 200 had a columnar shape and included a parallel portion having a diameter of 26 mm at a center position of the test specimen 200 in the longitudinal direction of the test specimen 200. Columnar portions of the test specimen 200, which are other than the parallel portion, had a diameter of 22 mm.

The test specimen 200 was subjected to induction hardening. Specifically, a heating temperature was set at 1000° C., and a heating time was set at 20 seconds. The heated test specimen 200 was subjected to water cooling. The test specimen 200 subjected to the induction hardening was subjected to tempering in which the test specimen 200 was held at a tempering temperature of 150° C. for 1 hour. Through the above processes, the test specimen 200, which was an induction-hardened component, was produced. For each test number, a plurality of induction-hardened components (test specimens 200) were produced.

Figure 2:
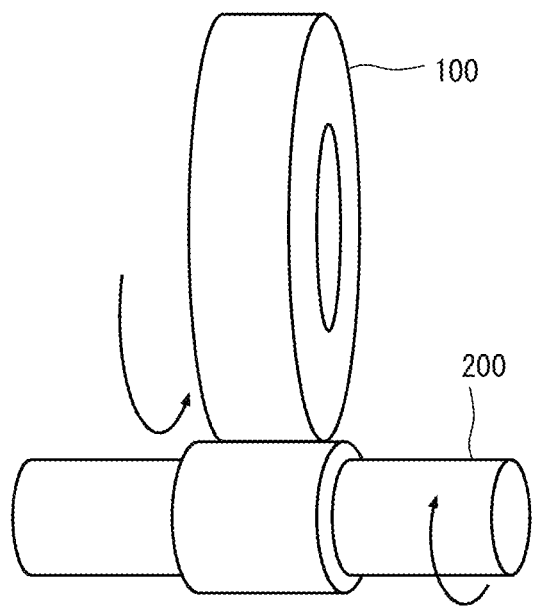
FIG. 2 is a schematic diagram of a roller-pitting fatigue test.

The test specimens 200 were used to conduct a roller-pitting test illustrated in FIG. 2 to evaluate roller-pitting fatigue strengths of the induction-hardened components. Specifically, with reference to FIG. 2, the test specimen 200 was rotated while a large roller specimen 100 was pressed against the test specimen 200. As the large roller specimen 100, a specimen obtained by subjecting a steel material having a chemical composition equivalent to that of SCM722 specified in JIS G 4053(2016) to carburizing treatment and then to surface polishing was used. The large roller specimen 100 had a radius of 130 mm.

In the roller-pitting fatigue test, the large roller specimen 100 was pressed against the test specimen 200 with different interfacial pressures in terms of Hertzian stress. Both roller specimens (the test specimen 200 and the large roller specimen 100) are rotated such that directions of peripheral velocities of both roller specimens at their contact portion were the same, and a specific sliding was set at −40% (the peripheral velocity of the large roller specimen 100 was higher than that of the test specimens 200 by 40%). A temperature of automatic transmission fluid (ATF), which was supplied to the contact portion as a lubricant, was set at 80° C. A contact stress between the large roller specimen 100 and the test specimen 200 was set at 3000 to 3300 MPa. A test cutoff was set at 10000000 times ($10^7$ times). In a case where the number of revolutions reached 10000000 with no pitting occurring in the test specimen 200, the induction-hardened component (test specimen 200) was evaluated to be excellent in roller-pitting fatigue strength. Specifically, the evaluation was conducted as follows.

Evaluation A: the number of revolutions reached $10^7$ with a contact stress of 3300 MPa Evaluation B: the number of revolutions reached $10^7$ with a contact stress of 3200 MPa but did not reach $10^7$ with a contact stress of 3300 MPa Evaluation C: the number of revolutions reached $10^7$ with a contact stress of 3100 MPa but did not reach $10^7$ with a contact stress of 3200 MPa Evaluation D: the number of revolutions reached $10^7$ with a contact stress of 3000 MPa but did not reach $10^7$ with a contact stress of 3100 MPa Evaluation X: the number of revolutions did not reach $10^7$ with a contact stress of 3000 MPa When the evaluation fell under one of Evaluations A to D, the induction-hardened component was determined to be excellent in roller-pitting fatigue strength. When the evaluation fell under Evaluation X, the induction-hardened component was determined to be low in roller-pitting fatigue strength. Results of the evaluation are shown in the column "Roller-pitting fatigue strength" in the column "Induction-hardened component" in Table 3 and Table 4. The occurrence of pitting was detected with a vibration meter built in a testing machine; after a vibration was detected, the rotations of both roller specimens were stopped, and then the occurrence of pitting and the number of revolutions were checked.

[Test for Measuring Martensite Area Fraction of Hardened Layer of Induction-Hardened Component]

A martensite area fraction of a hardened layer of a test specimen 200 of each test number was determined by the following method. A sample was extracted from a 0.2 mm depth position from a surface of a parallel portion of the test specimen 200. A surface of the sample (referred to as an observation surface) was subjected to mirror polishing and then immersed in the Nital etchant to be etched, by which a structure appeared. The etched observation surface was observed under an optical microscope with 400× magnification, and photographic images were created. In the observation surface, given three visual fields were observed. The visual fields were each made to have an area of 130 μm×260 μm. In each visual field, phases of martensite, ferrite, pearlite, and the like can be distinguished from one another by their contrasts. Specifically, when the observation surface is etched with the Nital etchant, phases each having a lamella structure can be identified as pearlite. Regions each having a brightness higher than that of pearlite (white regions) can be identified as ferrite. Regions each having a brightness lower than that of ferrite and pearlite (dark regions) can be identified as martensite. Thus, in each visual field, an area of martensite was determined. Based on a total area of martensite in the three visual fields and a total area of the visual fields, the martensite area fraction (%) was defined. The determined martensite area fractions are shown in "Martensite area fraction (%)" in the column "Hardened layer" in the column "Induction-hardened component" in Table 3 and Table 4.

[Test for Measuring Chemical Composition, Ferrite Area Fraction, and $Mn_\theta$ and $Cr_\theta$, Concentration of Mn and Concentration of Cr in Cementite, of Core Portion of Induction-Hardened Component]

For a core portion of a test specimen 200 of each test number, its chemical composition, a ferrite area fraction of its microstructure, and $Mn_\theta$ and $Cr_\theta$, a concentration of Mn and a concentration of Cr in its cementite, were determined by the following method. A sample was extracted from a core portion of an induction-hardened component. The extracted sample was subjected to a well-known component analysis process. Specifically, machined chips were produced from the sample with a drill, and the machined chips were extracted. The extracted machined chips were caused to be dissolved in acid, by which their solution was obtained. The solution was subjected to ICP-AES, by which an elementary analysis of the chemical composition was conducted. A content of C and a content of S were determined by a well-known high-frequency combustion (infrared absorptiometry after combustion). A content of N was determined by a well-known inert gas fusion thermal conductivity method. As a result of the measurement, in every test number, the chemical composition of the core portion was the same as the chemical composition of the steel material of the same test number.

Moreover, the sample of the core portion was used to determine a ferrite area fraction of its microstructure and $Mn_\theta$ and $Cr_\theta$, a concentration of Mn and a concentration of Cr in its cementite, by the same method as that for the steel material (steel bar) described above. The obtained concentrations of Mn, $Mn_\theta$, are shown in the column "$Mn_\theta$ (mass %)" in the column "Core portion" in the column "Induction-hardened component" in Table 3 and Table 4. The obtained concentrations of Cr, $Cr_\theta$, are shown in the column "$Cr_\theta$ (mass %)" in the column "Core portion" in the column "Induction-hardened component" in Table 3 and Table 4. The obtained ferrite area fractions are shown in the column "Ferrite area fraction (%)" in the column "Core portion" in the column "Induction-hardened component" in Table 3 and Table 4.

[Tests for Evaluating High-Cycle Bending Fatigue Strength and Low-Cycle Bending Fatigue Strength]

A high-cycle bending fatigue strength and a low-cycle bending fatigue strength of an induction-hardened component were evaluated by the following method. The steel material of each test number was subjected to machining (cutting) to be fabricated into a rotating bending test specimen illustrated in FIG. 3 (hereinafter, simply referred to as a test specimen). In a case where a diameter of the steel material was less than 80 mm, the test specimen was extracted such that a center position of a cross section of the test specimen perpendicular to a longitudinal direction of the test specimen matched a center position of a cross section of the steel material perpendicular to the longitudinal direction of the steel material. The longitudinal direction of the test specimen was parallel to the longitudinal direction of the steel material. In a case where a diameter of the steel material was 80 mm or more, the test specimen was extracted such that a center position of a cross section of the test specimen perpendicular to the longitudinal direction of the test specimen matched a center position of a radius R (i.e., 2/R position) of a cross section of the steel material perpendicular to the longitudinal direction of the steel material. The longitudinal direction of the test specimen was parallel to the longitudinal direction of the steel material.

Figure 3:
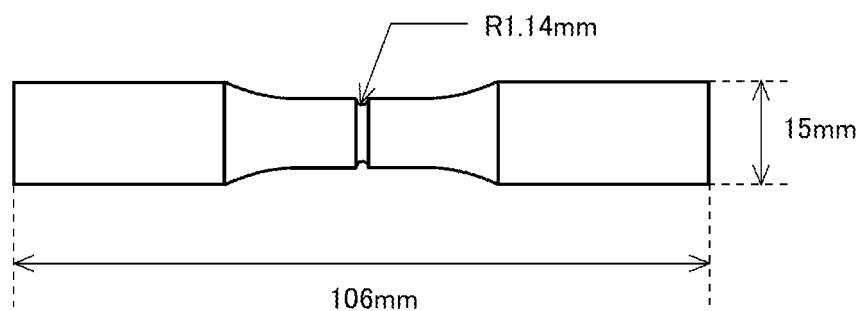
FIG. 3 is a plan view of the rotating bending fatigue test specimen fabricated in Example.

Numeric values in FIG. 3 indicate dimensions (mm). A notch was formed at a center position of the test specimen in a longitudinal direction of the test specimen. At a notch root, a diameter of the test specimen was 9 mm. A notched portion had a radius of curvature R of 1.14 mm.

The test specimen was subjected to induction hardening. Specifically, a heating temperature was set at 1000° C., and a heating time was set at 5 seconds. The heated test specimen was subjected to water cooling. The test specimen 200 subjected to the induction hardening was subjected to tempering in which the test specimen 200 was held at a tempering temperature of 150° C. for 1 hour. Through the above processes, the test specimen, which was an induction-hardened component, was produced. For each test number, a plurality of test specimens were produced.

[Test for Evaluating High-Cycle Bending Fatigue Strength]

Each test specimen (induction-hardened component) was used to conduct the rotating bending fatigue test (high-cycle bending fatigue test). Specifically, in the rotating bending fatigue test, an applied load was adjusted to cause a predetermined bending stress, and a test cutoff was set at 10000000 times ($1\times10^7$ times). In a case where the number of revolutions reached 10000000 with no rupture of the fatigue test specimen, the induction-hardened component was determined to be excellent in high-cycle bending fatigue strength. Specifically, the evaluation was conducted as follows.

Evaluation A: the number of revolutions reached $10^7$ with a bending stress of 680 MPa Evaluation B: the number of revolutions reached $10^7$ with a bending stress of 665 MPa but did not reach $10^7$ with a bending stress of 680 MPS.

Evaluation C: the number of revolutions reached $10^7$ with a bending stress of 650 MPa but did not reach $10^7$ with a bending stress of 665 MPa Evaluation X: the number of revolutions did not reach $10^7$ with a bending stress of 650 MPa When the evaluation fell under one of Evaluations A to C, the induction-hardened component was determined to be excellent in high-cycle bending fatigue strength. When the evaluation fell under Evaluation X, the induction-hardened component was determined to be low in high-cycle bending fatigue strength. Results of the evaluation are shown in the column "High-cycle bending fatigue strength" in the column "Induction-hardened component" in Table 3 and Table 4.

[Test for Evaluating Low-Cycle Bending Fatigue Strength]

As with the test for evaluating a high-cycle bending fatigue strength, a test specimen (induction-hardened component) was used to conduct the rotating bending fatigue test (low-cycle bending fatigue test). Specifically, in the rotating bending fatigue test, an applied load was adjusted to cause a predetermined bending stress, and a test cutoff was set at 10000 times ($1\times10^4$ times). In a case where the number of revolutions reached 10000 with no rupture of the fatigue test specimen, the induction-hardened component was determined to be excellent in low-cycle bending fatigue strength. Specifically, the evaluation was conducted as follows.

Evaluation A: the number of revolutions reached $10^4$ with a bending stress of 850 MPa.

Evaluation B: the number of revolutions reached $10^4$ with a bending stress of 825 MPa but did not reach $10^7$ with a bending stress of 850 MPa Evaluation C: the number of revolutions reached $10^4$ with a bending stress of 800 MPa but did not reach $10^4$ with a bending stress of 825 MPa Evaluation X: the number of revolutions did not reach $10^4$ with a bending stress of 800 MPa When the evaluation fell under one of Evaluations A to C, the induction-hardened component was determined to be excellent in low-cycle bending fatigue strength. When the evaluation fell under Evaluation X, the induction-hardened component was determined to be low in low-cycle bending fatigue strength.

Results of the evaluation are shown in the column "Low-cycle bending fatigue strength" in the column "Induction-hardened component" in Table 3 and Table 4.

[Test Results]

Results of the tests are shown in Table 3 and Table 4.

Referring to Table 1 to Table 4, in Test Nos. 2, 3, 6 to 8, 10, 13, 14, 17, 18, 22, 25, 26, 29, 30, 33 to 37, 39, 40, 42, 43, 45, 46, and 48 to 61, their chemical compositions were appropriate, and FN1 to FN4 satisfied Formula (1) to Formula (4). Therefore, the steel materials of the test numbers had high machinabilities. In addition, FN5 of their steel materials satisfied Formula (5), and ferrite area fractions of their steel materials were 40% or less because their production conditions were appropriate. As a result, induction-hardened components produced by subjecting the steel materials to induction hardening were excellent in roller-pitting fatigue strength, high-cycle bending fatigue strength, and low-cycle bending fatigue strength. Note that, in the induction-hardened components produced by subjecting the steel materials of these test numbers to induction hardening, martensite area fractions of their hardened layers were 90% or more. In addition, FN5 of their core portions satisfied Formula (5), and ferrite area fractions of their core portions were 40% or less.

In contrast, in Test No. 1, its content of C was excessively high. As a result, its machinability was low. In addition, when induction hardening was performed, hardening cracking occurred. As a result, the test for evaluating a machinability of its steel material, and the tests for evaluating a roller-pitting fatigue strength, a high-cycle bending fatigue strength, and a low-cycle bending fatigue strength of its induction-hardened component were not conducted (shown as "-" in the columns of the corresponding test items in Table 3 and Table 4).

In Test No. 4, its content of C was excessively low. As a result, an induction-hardened component produced by subjecting its steel material to induction hardening was low in a roller-pitting fatigue strength, a high-cycle bending fatigue strength, and a low-cycle bending fatigue strength.

In Test No. 5, its content of Si was excessively high. As a result, an induction-hardened component produced by subjecting its steel material to induction hardening was low in a roller-pitting fatigue strength, a high-cycle bending fatigue strength, and a low-cycle bending fatigue strength.

In Test No. 9, its content of Mn was excessively low. As a result, cracking occurred during hot working. As a result, the test for evaluating a machinability of its steel material, and the tests for evaluating a roller-pitting fatigue strength, a high-cycle bending fatigue strength, and a low-cycle bending fatigue strength of its induction-hardened component were not conducted (shown as "-" in the columns of the corresponding test items in Table 3 and Table 4).

In Test No. 11, Cr was not contained. As a result, cracking occurred during hot working. As a result, the test for evaluating a machinability of its steel material, and the tests for evaluating a roller-pitting fatigue strength, a high-cycle bending fatigue strength, and a low-cycle bending fatigue strength of its induction-hardened component were not conducted (shown as "-" in the columns of the corresponding test items in Table 3 and Table 4).

In Test No. 12, its content of S was excessively high. As a result, a high-cycle bending fatigue strength and a low-cycle bending fatigue strength of its induction-hardened component were low.

In Test No. 15, its content of S was excessively low. As a result, a machinability of its steel material was low.

In Test No. 16, its content of B was excessively low. As a result, a low-cycle bending fatigue strength of its induction-hardened component was low.

In Test No. 19, its content of B was excessively high. As a result, cracking occurred during hot working. As a result, the test for evaluating a machinability of its steel material, and the tests for evaluating a roller-pitting fatigue strength, a high-cycle bending fatigue strength, and a low-cycle bending fatigue strength of its induction-hardened component were not conducted (shown as "-" in the columns of the corresponding test items in Table 3 and Table 4).

In Test No. 20, its content of N was excessively high. As a result, cracking occurred during hot working. As a result, the test for evaluating a machinability of its steel material, and the tests for evaluating a roller-pitting fatigue strength, a high-cycle bending fatigue strength, and a low-cycle bending fatigue strength of its induction-hardened component were not conducted (shown as "-" in the columns of the corresponding test items in Table 3 and Table 4).

In Test No. 21, FN4 did not satisfy Formula (4). As a result, a low-cycle bending fatigue strength of its induction-hardened component was low.

In Test No. 23, its content of N was excessively low. As a result, a high-cycle bending fatigue strength and a low-cycle bending fatigue strength of its induction-hardened component were low.

In Test No. 24, its content of Ti was excessively high. As a result, cracking occurred during hot working. As a result, the test for evaluating the machinability of the steel material, and the tests for evaluating the roller-pitting fatigue strength, the high-cycle bending fatigue strength, and the low-cycle bending fatigue strength of the induction-hardened component were not conducted (shown as "-" in the columns of the corresponding test items in Table 3).

In Test No. 27, its content of Ti was excessively low. As a result, Formula (4) was not satisfied. As a result, a low-cycle bending fatigue strength of its induction-hardened component was low.

In Test No. 28, its content of Al was excessively high. As a result, a roller-pitting fatigue strength, a high-cycle bending fatigue strength, and a low-cycle bending fatigue strength of its induction-hardened component were low.

In Test No. 31, its content of Al was excessively low. As a result, a high-cycle bending fatigue strength and a low-cycle bending fatigue strength of its induction-hardened component were low.

In Test No. 32, its content of P was excessively high. As a result, a high-cycle bending fatigue strength and a low-cycle bending fatigue strength of its induction-hardened component were low.

In Test No. 38, FN1 was less than a lower limit of Formula (1). As a result, a roller-pitting fatigue strength of its induction-hardened component was low.

In Test No. 41, FN2 was more than an upper limit of Formula (2). As a result, a martensite area fraction of its steel material was more than 10%. As a result, a machinability of its steel material was low.

In Test No. 44, FN3 was less than a lower limit of Formula (3). As a result, a roller-pitting fatigue strength, a high-cycle bending fatigue strength, and a low-cycle bending fatigue strength of its induction-hardened component were low.

In Test No. 47, its average cooling rate CR in the normalizing treatment was excessively low. As a result, FN5 did not satisfy Formula (5) in its steel material. As a result, a roller-pitting fatigue strength, a high-cycle bending fatigue strength, and a low-cycle bending fatigue strength of its induction-hardened component were low.

In Test Nos. 62 and 63, the normalizing treatment was not performed. As a result, FN5 did not satisfy Formula (5) in their steel materials. As a result, roller-pitting fatigue strengths, high-cycle bending fatigue strengths, and low-cycle bending fatigue strengths of their induction-hardened components were low.

In Test No. 66, its average cooling rate CR in the normalizing treatment was excessively high. As a result, a martensite area fraction of its steel material was more than 10%. As a result, a machinability of its steel material was low.

An embodiment according to the present invention has been described above. However, the embodiment described above is merely an example of practicing the present invention. The present invention is therefore not limited to the embodiment described above, and the embodiment described above can be modified and practiced as appropriate without departing from the scope of the present invention.

REFERENCE SIGNS LIST

100 large roller specimen
200 test specimen

The invention claimed is:

1. A steel material comprising a chemical composition consisting of, in mass %:
C: 0.40 to 0.70%,
Si: 0.15 to 2.10%,
Mn: 0.30 to 1.15%,
Cr: 0.01 to less than 0.50%,
S: 0.005 to 0.070%,
N: 0.0020 to 0.0200%,
Ti: 0.0080 to 0.2000%,
B: 0.0005 to 0.0050%,
Al: 0.005 to 0.100%,
P: less than 0.050%,
Mo: 0 to 1.00%,
Ni: 0 to 1.00%,
Cu: 0 to 1.00%,
Ca: 0 to 0.0050%,
Mg: 0 to 0.0050%,
Te: 0 to 0.20%,
rare earth metal: 0 to 0.0050%,
Zr: 0 to 0.0050%,
Nb: 0 to 0.20%,
V: 0 to 0.35%,
Sb: 0 to 0.015%,
Pb: 0 to 0.09%, and
with the balance being Fe and impurities, and satisfying Formula (1) to Formula (5), wherein a ferrite area fraction is 40% or less, and a martensite area fraction is 10% or less:

$$290C+50Si+430 \geq 631.0 \tag{1}$$

$$C+(1/7)Si+(1/5)Mn+(1/9)Cr+V+(1/25)Mo \leq 0.900 \tag{2}$$

$$(1+0.7Si) \times (1+3.3333Mn) \times (1+2.16Cr) \times (1+3.00Mo) \times (1+1.73V) \times (1+0.365Cu) \times (1+0.363Ni) \times (2.616-1.6C) \geq 5.80 \tag{3}$$

$$Ti-4 \times N \geq 0 \tag{4}$$

$$9.7Mn_\theta + 32.4Cr_\theta \leq 25.9 \tag{5}$$

where each symbol of an element in Formula (1) to Formula (4) is to be substituted by a content of a corresponding element (mass %), and if the corresponding element is not contained, the symbol of an element is to be substituted by "0"; $Mn_\theta$ in Formula (5) is to be substituted by a concentration of Mn (mass %)

in cementite, and $Cr_\theta$ in Formula (5) is to be substituted by a concentration of Cr (mass %) in cementite.

2. The steel material according to claim 1, wherein the chemical composition further contains, in lieu of a part of Fe, one or more types of element selected from the group consisting of:
Mo: 0.01 to 1.00%,
Ni: 0.01 to 1.00%,
Cu: 0.01 to 1.00%,
Ca: 0.0001 to 0.0050%,
Mg: 0.0001 to 0.0050%,
Te: 0.01 to 0.20%,
rare earth metal: 0.0001 to 0.0050%,
Zr: 0.0001 to 0.0050%,
Nb: 0.01 to 0.20%,
V: 0.01 to 0.35%,
Sb: 0.001 to 0.015%, and
Pb: 0.01 to 0.09%.

3. A component comprising
a hardened layer, and
a core portion inner than the hardened layer, wherein
the hardened layer has a martensite area fraction of 90% or more, and
the core portion has
a chemical composition consisting of, in mass %:
C: 0.40 to 0.70%,
Si: 0.15 to 2.10%,
Mn: 0.30 to 1.15%,
Cr: 0.01 to less than 0.50%,
S: 0.005 to 0.070%,
N: 0.0020 to 0.0200%,
Ti: 0.0080 to 0.2000%,
B: 0.0005 to 0.0050%,
Al: 0.005 to 0.100%,
P: less than 0.050%,
Mo: 0 to 1.00%,
Ni: 0 to 1.00%,
Cu: 0 to 1.00%,
Ca: 0 to 0.0050%,
Mg: 0 to 0.0050%,
Te: 0 to 0.20%,
rare earth metal: 0 to 0.0050%,
Zr: 0 to 0.0050%,
Nb: 0 to 0.20%,
V: 0 to 0.35%,
Sb: 0 to 0.015%,
Pb: 0 to 0.09%, and
with the balance being Fe and impurities, and
satisfying Formula (1) to Formula (5), wherein
a ferrite area fraction is 40% or less, and a martensite area fraction is 10% or less:

$$290C+50Si+430 \geq 631.0 \quad (1)$$

$$C+(\tfrac{1}{7})Si+(\tfrac{1}{5})Mn+(\tfrac{1}{9})Cr+V+(\tfrac{1}{25})Mo \leq 0.900 \quad (2)$$

$$(1+0.7Si)\times(1+3.3333Mn)\times(1+2.16Cr)\times(1+3.00Mo)\times (1+1.73V)\times(1+0.365Cu)\times(1+0.363Ni)\times(2.616-1.6C) \geq 5.80 \quad (3)$$

$$Ti-4\times N \geq 0 \quad (4)$$

$$9.7Mn_\theta+32.4Cr_\theta \leq 25.9 \quad (5)$$

where each symbol of an element in Formula (1) to Formula (4) is to be substituted by a content of a corresponding element (mass %), $Mn_\theta$ in Formula (5) is to be substituted by a concentration of Mn (mass %) in cementite, and $Cr_\theta$ in Formula (5) is to be substituted by a concentration of Cr (mass %) in cementite.

4. The component according to claim 3, wherein the chemical composition further contains, in lieu of a part of Fe, one or more types of element selected from the group consisting of:
Mo: 0.01 to 1.00%,
Ni: 0.01 to 1.00%,
Cu: 0.01 to 1.00%,
Ca: 0.0001 to 0.0050%,
Mg: 0.0001 to 0.0050%,
Te: 0.01 to 0.20%,
rare earth metal: 0.0001 to 0.0050%,
Zr: 0.0001 to 0.0050%,
Nb: 0.01 to 0.20%,
V: 0.01 to 0.35%,
Sb: 0.001 to 0.015%, and
Pb: 0.01 to 0.09%.

* * * * *